United States Patent
Kang et al.

(10) Patent No.: US 10,039,007 B2
(45) Date of Patent: Jul. 31, 2018

(54) METHOD OF OPERATING ENTITIES IN COEXISTENCE MANAGEMENT SYSTEM

(71) Applicant: Electronics and Telecommunications Research Institute, Daejeon (KR)

(72) Inventors: Hyun Duk Kang, Gwangju (KR); Gwang Zeen Ko, Daejeon (KR); Myung Sun Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 251 days.

(21) Appl. No.: 14/890,946

(22) PCT Filed: May 9, 2014

(86) PCT No.: PCT/KR2014/004183
§ 371 (c)(1),
(2) Date: Nov. 13, 2015

(87) PCT Pub. No.: WO2014/185667
PCT Pub. Date: Nov. 20, 2014

(65) Prior Publication Data
US 2016/0088488 A1    Mar. 24, 2016

(30) Foreign Application Priority Data

May 13, 2013 (KR) .................. 10-2013-0053977
May 7, 2014 (KR) .................. 10-2014-0054253

(51) Int. Cl.
*H04W 72/00* (2009.01)
*H04W 16/14* (2009.01)
(Continued)

(52) U.S. Cl.
CPC ........... *H04W 16/14* (2013.01); *H04W 24/02* (2013.01); *H04W 76/27* (2018.02)

(58) Field of Classification Search
CPC . H04W 16/14; H04W 72/0453; H04W 24/02; H04W 48/16; H04W 72/06; H04W 76/046
See application file for complete search history.

(56) References Cited

U.S. PATENT DOCUMENTS 8,804,510 B2    8/2014    Lee et al.
8,838,798 B2    9/2014    Lee et al.
(Continued)

FOREIGN PATENT DOCUMENTS

KR    1020080010907 A    1/2008
KR    1020080076262 A    8/2008
(Continued)

OTHER PUBLICATIONS

"IEEE Standard for Information technology—Telecommunications and information exchange between systems—Local and metropolitan area networks—Specific requirements—Part 19: TV White Space Coexistence Methods," IEEE Std 802.19.1™-2014, May 2, 2014, pp. 1-314, The Institute of Electrical and Electronics Engineers, Inc., New York, USA.

*Primary Examiner* — Khalid Shaheed
(74) *Attorney, Agent, or Firm* — William Park & Associates Ltd.

(57) ABSTRACT

Disclosed is an operating method of each entity in a coexistence management system that manages a plurality of frequency sharing devices. To perform operations of respective entities (a coexistence enabler (CE), a coexistence manager (CM), and a coexistence discovery and information server (CDIS)), a state machine of the entities is defined as inactive, active, waiting engagement, engaged, request-sent, and request-received states.

38 Claims, 16 Drawing Sheets

(51) Int. Cl.
*H04W 24/02* (2009.01)
*H04W 76/27* (2018.01)

(56) References Cited

U.S. PATENT DOCUMENTS

| | | | | |
|---|---|---|---|---|
| 2012/0094681 A1* | 4/2012 | Freda | ............... | H04W 72/02 |
| | | | | 455/452.1 |
| 2012/0106461 A1* | 5/2012 | Kasslin | ............... | H04W 16/14 |
| | | | | 370/329 |
| 2013/0058247 A1 | 3/2013 | Chen et al. | | |
| 2013/0142129 A1* | 6/2013 | Rinne | ............... | H04W 24/00 |
| | | | | 370/329 |
| 2013/0165170 A1* | 6/2013 | Kang | ............... | H04W 72/0453 |
| | | | | 455/509 |
| 2013/0295948 A1* | 11/2013 | Ye | ............... | H04W 72/0453 |
| | | | | 455/452.1 |

FOREIGN PATENT DOCUMENTS

| | | |
|---|---|---|
| KR | 1020100041235 A | 4/2010 |
| KR | 1020120047830 A | 5/2012 |
| KR | 1020120076321 A | 7/2012 |
| WO | 2012030190 A2 | 3/2012 |
| WO | 2012057584 A2 | 5/2012 |

\* cited by examiner

METHOD OF OPERATING ENTITIES IN COEXISTENCE MANAGEMENT SYSTEM

TECHNICAL FIELD

The present invention relates to a coexistence management system, and more particularly, to operating methods of respective entities in a coexistence management system that manages a plurality of frequency sharing devices.

BACKGROUND ART

A coexistence technology is a spectrum management technology that enables wireless devices using different communication protocols at a core frequency (30 MHz to 10 GHz), in which various dynamic spectrum access (DSA) technologies are expected to emerge, to coexist without harmful interference. The DSA technologies, such as underlay and overlay approaches, which are an opposing concept to a current static spectrum management technology, are wireless access and management technologies in which a spectrum is dynamically managed according to radio environments around wireless devices to maximize flexibility and efficiency of frequency use. To prepare for spectrum sharing technologies which variously emerge for respective wireless services, such as Institute of Electrical and Electronics Engineers (IEEE) 802 Standards Coordinating Committee (SCC) 41, a technology for deriving coexistence standards capable of comprehensively operating a plurality of sharing technologies in terms of spectrum management by countries is under development.

Domestically, research into integrated coexistence conditions of various sharing technologies for securing optimal frequency efficiency among various white space objects (WSOs) under congested radio environments, such as a frequency auction system and sharing of a licensed band and an unlicensed band, has not been systematically conducted. Technical issues about a coexistence scenario between spectrum sharing wireless systems in a licensed band and an unlicensed band, coexistence analysis, a sharing mechanism for coexistence, etc. are being discussed in the wireless coexistence working group that handles a coexistence problem between the 802 standards in the international standardization organization, the IEEE 802.19.

DISCLOSURE

Technical Problem

The present invention is directed to providing an entity operating method for interference avoidance and efficient resource management in a coexistence management system for managing a plurality of frequency sharing devices.

Technical Solution

One aspect of the present invention provides an operating method of a coexistence manager (CM) in a coexistence management system including a coexistence enabler (CE), the CM, and a coexistence discovery and information server (CDIS). The operating method performed by the CM includes: sending a connection request to the CDIS or another CM in an active state, and then transitioning to a waiting engagement state; when a connection response is received in the waiting engagement state within a predetermined time, transitioning to an engaged state; when an information request is received from one of the CE, the CDIS, and another CM, transitioning to a request-received state; sending requested information to the one of the CE, the CDIS, and another CM in the request-received state in response to the request, and returning to the engaged state; requesting information from one of the CE, the CDIS, and another CM in the engaged state, and transitioning to a request-sent state; and when the requested information is received from the one of the CE, the CDIS, and another CM in the request-sent state, returning to the engaged state.

In an exemplary embodiment, the operating method may further include, when no connection response is received from the CDIS or another CM, to which the connection request is sent, in the waiting engagement state, returning to the active state.

In an exemplary embodiment, the operating method may further include: terminating a connection with the CDIS or another CM when, in the engaged state, the CM sends a disconnection request to the CDIS or another CM, receives a disconnection request from the CDIS or another CM, or does not periodically receive a being-engagement request from the CE or another CM; and transitioning to the active state when there is no CE provided with a coexistence service by the CM.

In an exemplary embodiment, the operating method may further include, when an event designated by the CE or another CM occurs in the engaged state, sending information on the event to the CE or another CM.

In an exemplary embodiment, the operating method may further include, when an event designated by the CM occurs in the engaged state due to the CE or another CM, receiving information on the event from the CE or another CM.

In an exemplary embodiment, the information requested by the one of the CE, the CDIS, and another CM in the engaged state may be channel classification information or a coexistence report.

In an exemplary embodiment, the information requested from the one of the CE, the CDIS, and another CM in the engaged state may be an available channel list, channel classification information, a measurement result, or coexistence set information.

Another aspect of the present invention provides an operating method of a CE in a coexistence management system including the CE, a CM, and a CDIS. The operating method performed by the CE includes: sending a connection request to the CM in an active state, and then transitioning to a waiting engagement state; when a connection response is received from the CM in the waiting engagement state within a predetermined time, transitioning to an engaged state; when an information request is received from a white space object (WSO) or the CM associated with the CE, transitioning to a request-received state; sending requested information to the CM or the WSO in the request-received state in response to the request, and returning to the engaged state; requesting information from the WSO or the CM associated with the CE in the engaged state, and transitioning to a request-sent state; and when the requested information is received from the WSO or the CM in the request-sent state, returning to the engaged state.

In an exemplary embodiment, the operating method may further include returning to the active state when no connection response is received from the CM in the waiting engagement state within the predetermined time.

In an exemplary embodiment, the operating method may further include: terminating a connection with the WSO or the CM when, in the engaged state, the CE sends a disconnection request to the CM or the WSO, or receives a disconnection request from the CM; and transitioning to the active state.

In an exemplary embodiment, the operating method may further include maintaining the engaged state by periodically sending a being-engagement request to the CM.

Still another aspect of the present invention provides an operating method of a CDIS in a coexistence management system including a CE, a CM, and the CDIS. The operating method performed by the CDIS includes: when a connection request is received from the CM in an active state, sending a connection response to the CM and transitioning to an engaged state; when a request for information is received from the CM in the engaged state, transitioning to a request-received state; sending the requested information to the CM, and returning to the engaged state; requesting information from the CM in the engaged state, and transitioning to a request-sent state; and when the information requested by the CDIS is received from the CM, returning to the engaged state.

In an exemplary embodiment, the operating method may further include, when a being-engagement request is periodically received from the CM in the engaged state, maintaining the engaged state.

In an exemplary embodiment, the operating method may further include: terminating a connection with the CM when, in the engaged state, the CDIS receives a disconnection request from the CM, does not periodically receive a being-engagement request from the CM, or sends a disconnection request to the CM; and transitioning to the active state.

Advantageous Effects

Operating methods of coexistence manager (CM), coexistence enabler (CE), and coexistence discovery and information server (CDIS) entities of a coexistence management system proposed in the present invention facilitate interference avoidance and resource management among a plurality of different types of frequency sharing devices, thus making it possible to improve efficiency in frequency sharing among different types of frequency sharing devices.

MODES OF THE INVENTION

Since the present invention can be variously modified and have several embodiments, specific embodiments are illustrated in the accompanying drawings and will be described in detail in the description below. However, the present invention is not limited to the specific embodiments and should be construed as including all the changes, equivalents and substitutions included in the spirit and scope of the present invention.

In describing the present invention, the detailed description of related known technology will be omitted when it may obscure the gist of the present invention.

Singular expressions used herein include plural meanings unless specified otherwise in the context thereof.

Figure 1:
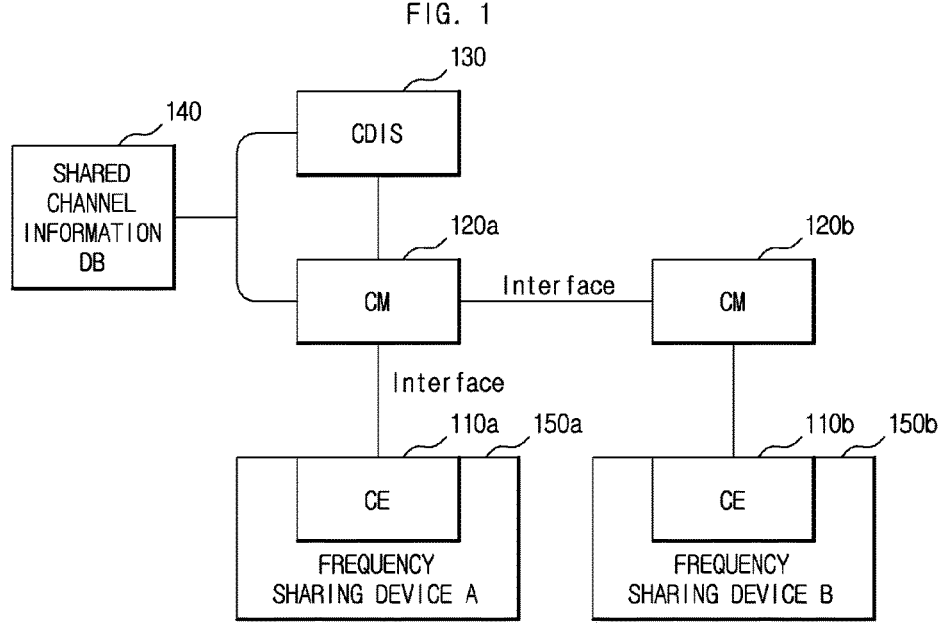
FIG. 1 shows a diagram showing a constitution of a coexistence management system.

FIG. 1 is a diagram showing a constitution of a coexistence management system.

As shown in the drawing, a coexistence management system can include three kinds of entities, that is, coexistence enablers (CEs) 110a and 110b, coexistence managers (CMs) 120a and 120b, and a coexistence discovery and information server (CDIS) 130, and a shared channel information database (DB) 140. For convenience of description, FIG. 1 shows two frequency sharing devices and two CEs and two CMs associated with the frequency sharing devices, but those of ordinary skill in the art would appreciate that the present invention is not limited to a constitution including a specific number of CEs and a specific number of CMs.

The CEs 110a and 110b are entities that are present in frequency sharing devices 150a and 150b and serve as passages between the frequency sharing devices 150a and 150b and the CMs 120a and 120b. The CEs 110a and 110b serve to extract context information (e.g., a wireless access scheme, transmission power, a spectrum sensing threshold value, and a position) associated with the corresponding frequency sharing devices (or the white space objects (WSOs) 150a and 150b) requested by the CMs 120a and 120b from the WSOs 150a and 150b and send the context information to the CMs 120a and 120b. Also, the CEs 110a and 110b serve to send event information (e.g., changes in the context information of the WSOs 150a and 150b) requested by the CMs 120a and 120b, and cause the WSOs 150a and 150b to reflect resetting of configurations of the WSOs 150a and 150b instructed by the CMs 120a and 120b.

The CMs 120a and 120b are entities that make important decisions associated with frequency sharing, such as operating frequency allocation, transmission power allocation, and transmission time allocation, for improving the efficiency of frequency sharing between the plurality of WSOs 150a and 150b. The CMs 120a and 120b can collect channel measurement information, etc. through the WSOs 150a and 150b.

In addition, when there is a need for cooperation with another CM controlling another frequency sharing device, the CMs 120a and 120b can exchange information directly or through the CDIS 130. The CMs 120a and 120b can discover neighbor WSOs of the WSOs 150a and 150b belonging to the CMs 120a and 120b.

The CMs 120a and 120b can obtain information on channels that can be used by the WSOs 150a and 150b from the channel information DB 140.

The CDIS 130 is an entity for assisting in decision making associated with control of the WSOs 150a and 150b. The CDIS 130 obtains necessary information from the plurality of CMs 120a and 120b, stores the obtained information, and sends information required by the CMs 120a and 120b connected thereto. The CDIS 130 can discover a neighbor frequency sharing device of a WSO belonging to each of the CMs 120a and 120b. Also, the CDIS 130 can obtain the information on the channels that can be used by the frequency sharing devices 150a and 150b from the channel information DB 140. The shared channel information DB 140 provides information on channels that can be used by frequency sharing devices.

Specifically, the CMs 120a and 120b can provide the WSOs 150a and 150b with two types of coexistence services, that is, a management service and an information service. The management service causes the WSOs 150a and 150b to reflect resetting of configurations of the WSOs 150a and 150b instructed by the CMs 120a and 120b. The information service delivers information associated with coexistence to the WSOs 150a and 150b through the CEs 110a and 110b, and enables the WSOs 150a and 150b to make important decisions associated with frequency sharing by themselves based on the information.

The CMs 120a and 120b can be operated under three kinds of topologies, namely, autonomous, centralized, and distributed topologies. In the autonomous topology, information for coexistence is exchanged among a plurality of CMs, but a decision associated with coexistence is made by each CM without a negotiation with another CM or help of a master CM. In the centralized topology, a plurality of slave CMs are connected to one master CM, and the slave CMs are controlled by the master CM to solve the coexistence problem of the WSOs 150a and 150b. On the other hand, in the distributed topology, the coexistence problem of the WSOs 150a and 150b is solved through negotiations between a CM and surrounding CMs.

The discovery of a neighbor frequency sharing device that may cause co-channel interference between WSOs is very important for coexistence of WSOs. Such a discovery of a neighbor frequency sharing device can be performed by the CMs 120a and 120b and/or the CDIS 130. First, neighbor frequency sharing devices can be classified into the following two kinds:

Neighbor frequency sharing devices between WSOs registered in the same CM (Intra-CM WSO neighbors), and Neighbor frequency sharing devices between WSOs registered in different CMs (Inter-CM WSO neighbors).

Neighbor CMs denote a case in which frequency sharing devices registered in different CMs are neighbor frequency sharing device. Based on a neighbor CM, a CDIS of a coexistence management system provides a CM with two types of discovery services according to the following two cases. A first discovery service is an inter-CM discovery service. In this case, a CM discovers an intra-CM neighbor, and a CDIS discovers an inter-CM neighbor. A second discovery service is an intra-CM and inter-CM discovery service. In this case, both kinds of neighbor discovery are performed by a CDIS only.

In an exemplary embodiment, to perform the above-described operations of the respective entities (CE, CM, and CDIS), a state machine of the entities can be defined as follows:

Inactive: a state before an initialization process, in which an entity cannot set up an interface with another entity Active: a state in which an entity is prepared to set up an interface with another entity Waiting engagement: a state in which an entity waits for a response after requesting interface setup from a counterpart entity Engaged: a state in which setup of an interface between an entity and a counterpart entity is completed, and it is possible to exchange messages with the counterpart entity Request sent: a state in which an entity has sent a message associated with a request to a counterpart entity and waits for a response from the counterpart entity Request received: a state in which an entity receives a message associated with a request from a counterpart entity and processes the request of the counterpart entity With reference to FIGS. 2 to 8, operation of each entity, that is, a CE, a CM, and a CDIS, of a coexistence management system will be described according to an exemplary embodiment of the present invention.

Figure 2:
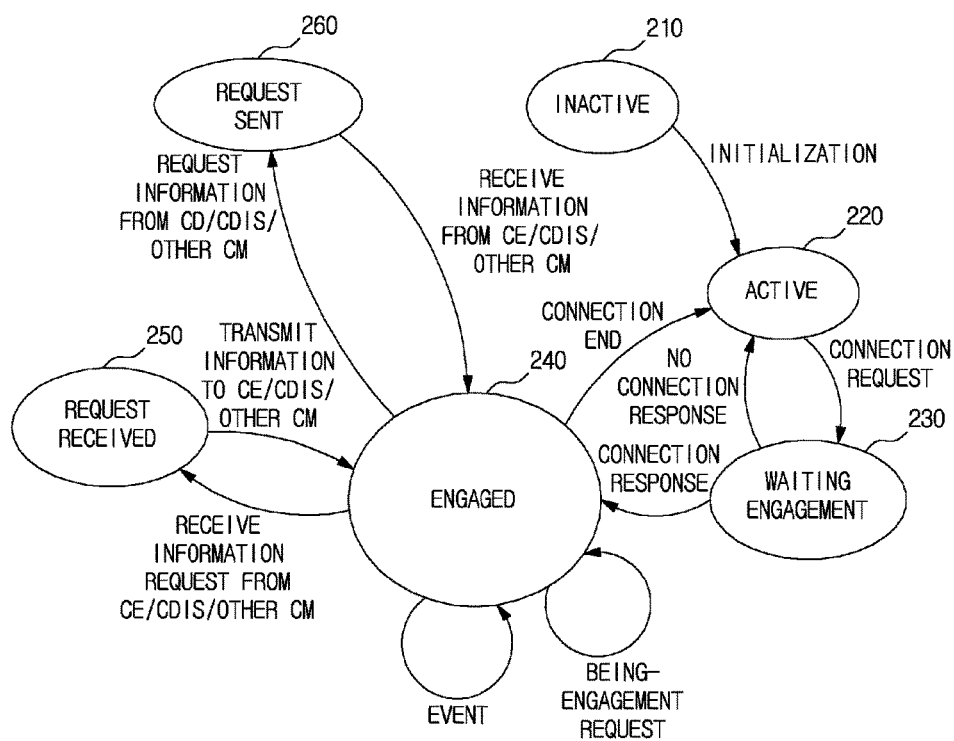
FIG. 2 shows a state machine diagram defined for operation of a coexistence manager (CM) in a coexistence management system according to an exemplary embodiment of the present invention.

FIG. 2 shows a state machine diagram defined for operation of a CM in a coexistence management system according to an exemplary embodiment of the present invention.

As shown in the drawing, states of a CM can be defined as an inactive state 210, an active state 220, a waiting engagement state 230, an engaged state 240, a request-sent state 250, and a request-received state 260.

Transition conditions between the states of a CM are as follows:

A CM transitions from the inactive state 210 to the active state 220 through an initialization process The CM sends a connection request to a CDIS/another CM in the active state 220 and then transitions to the waiting engagement state 230

The CM returns to the active state 220 when there is no connection response from the CDIS/another CM within a predetermined time in the waiting engagement state 230

The CM transitions to the engaged state 240 when there is a connection response from the CDIS/another CM within the predetermined time in the waiting engagement state 230

When information is requested by a CE/the CDIS/another CM in the engaged state 240, the CM transitions to the request-received state 260, sends the requested information to the CE/the CDIS/another CM, and returns to the engaged state 240

When an event request has been received from the CE/another CM in advance, the CM sends the corresponding event response to the CE/another CM in the engaged state 240 without receiving another event request from the CE/another CM When the CM has sent an event request to the CE/another CM in advance, the CM receives the corresponding event response from the CE/another CM in the engaged state 240 without sending an event request The CM returns to the request-sent state 250 after requesting information from the CE/the CDIS/another CM in the engaged state 240, and returns to the engaged state 240 upon receiving the requested information from the CE/the CDIS/another CM The CM maintains the engaged state 240 by periodically sending a being-engagement request to the CDIS/another CM in the engaged state 240

The CM sends a disconnection request to the CDIS/another CM in the engaged state 240, terminates the connection with the CDIS/another CM, and transitions to the active state 220

When a disconnection request is received from the CDIS/another CM in the engaged state 240 or a being-engagement request is not periodically received from the CE/another CM, the CM terminates the connection with the CDIS/another CM and transitions to the active state 220

Figure 3:
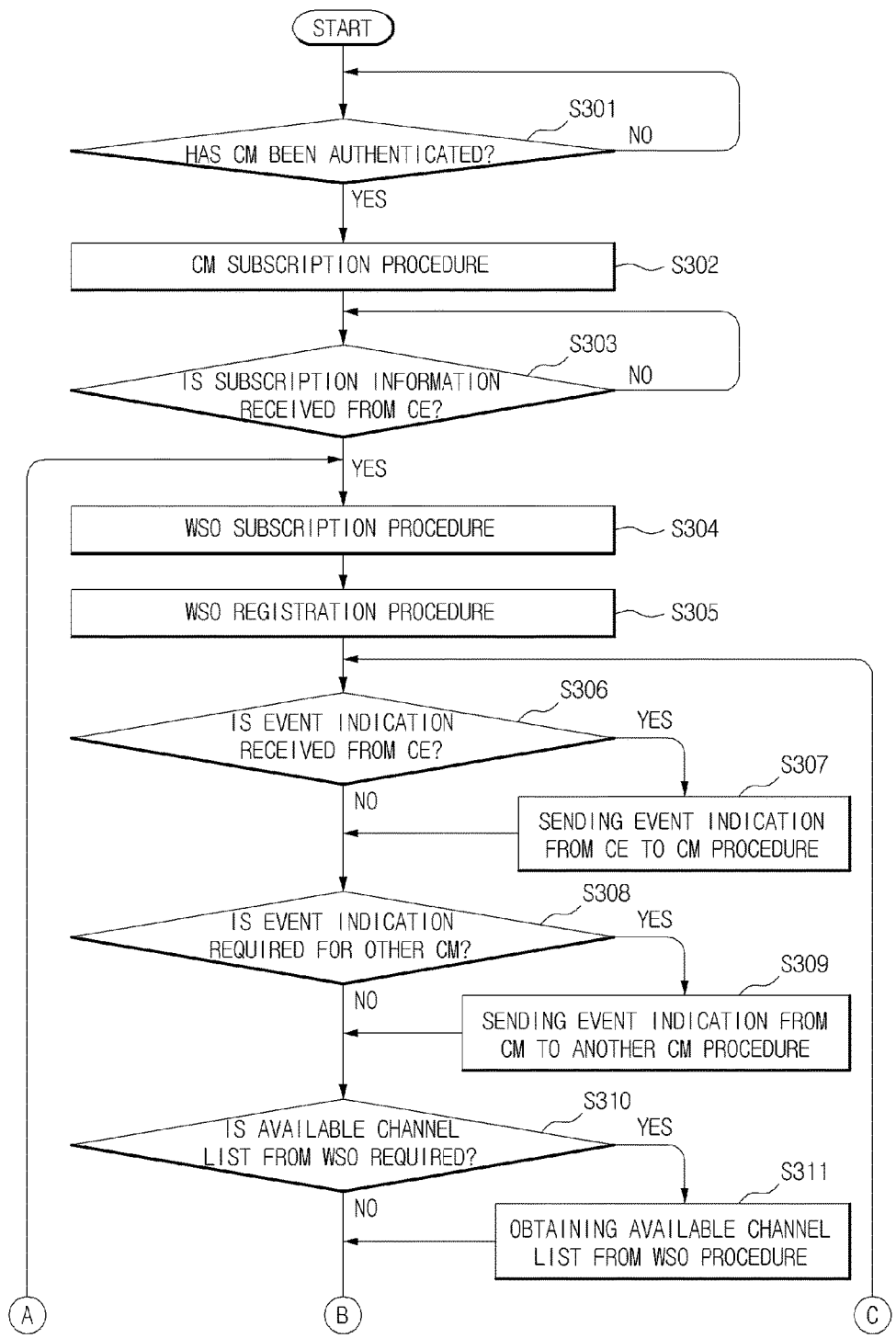
FIGS. 3 to 9 show a flowchart illustrating a CM operation in a coexistence management system according to an exemplary embodiment of the present invention.
Figure 4:
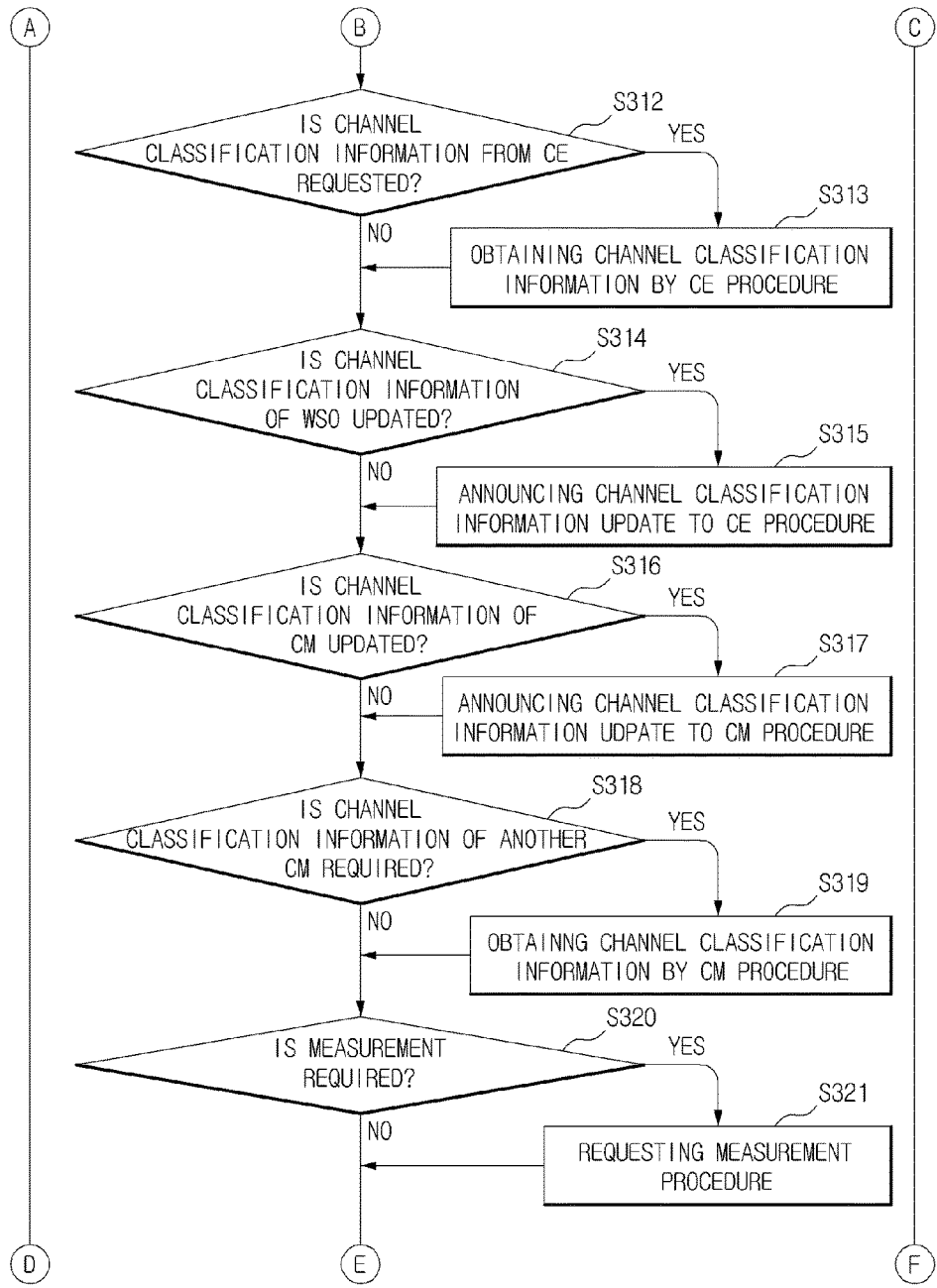

FIGS. 3 to 9 show a flowchart illustrating a CM operation in a coexistence management system according to an exemplary embodiment of the present invention. FIG. 3 sequentially shows the CM operation for convenience, but those of ordinary skill in the art would appreciate that the CM operation is not necessarily performed in the illustrated sequence.

After CM authentication is successfully completed in step 301, a CM performs a CM subscription procedure (S302), transitions to the engaged state, and checks an incoming message from a CE/a CDIS/another CM.

In an exemplary embodiment, the CM can generate a SubscriptionRequest message, send it to the CDIS, and then transition to the engaged state upon receiving a SubscriptionResponse message from the CDIS. Here, the subscription request message can include subscribed service type information indicating whether a service to which the CM will subscribe is the inter-CM coexistence discovery service or the inter-CM and intra-CM coexistence discovery services.

When the CM receives subscription information from the CE (S303), the CM sequentially performs a WSO subscription procedure and a WSO registration procedure (S304 and S305), and transitions to the engaged state.

In an exemplary embodiment, when a SubscriptionRequest message is received from the CE, the CM can generate a SubscriptionResponse message, send it to the CE, and then transition to the engaged state. Here, the SubscriptionRequest message can include subscribed service type information.

In an exemplary embodiment, when a CERegistrationRequest message is received from the CE, the CM can generate a RegistrationResponse message, send it to the CE, and then transition to the engaged state. Here, the CE registration request message can include at least one of the network identifier of a WSO, information on a wireless radio access technology used by the WSO, a network type, WSO discovery information, information indicating whether or not scheduled transmission is supported, available channel information, a supported channel number list, a WSO operating channel number list, resource information required for a WSO operation, and measurement capability information of the WSO.

In addition, the CM generates a CMRegistrationRequest message, sends it to the CDIS, and waits for a RegistrationResponse message from the CDIS.

When an event indication is received from the CE (S306), the CM performs a sending event indication from CE to CM procedure (S307), and transitions to the engaged state. In an exemplary embodiment, when an EventIndication message is received from the CE, the CM can generate an EventConfirm message and send it to the CE in response to the received event indication message and then transition to the engaged state.

When an event indication request is received from another CM (S308), the CM performs sending event indication from CM to another CM procedure (S309), and transitions to the engaged state. In an exemplary embodiment, the CM can generate an EventIndication message, send it to another CM, and then transition to the engaged state when an EventConfirm message is received from another CM. In an exemplary embodiment, the event indication message can include an event indicator (e.g., an indicator indicating that a signal-to-interference-plus-noise ratio (SINR) threshold has been reached or degradation of quality of service (QoS)).

When an available channel list from the WSO is required (S310), the CM performs obtaining available channel list from WSO procedure (S311), and transitions to the engaged state. In an exemplary embodiment, the CM can generate an AvailableChannelRequest message for requesting an available channel list, send it to the CE, receive an AvailableChannelResponse message from the CE, and then transition to the engaged state.

When a channel classification request is received from the CE (S312), the CM performs obtaining channel classification information by CE procedure (S313), and transitions to the engaged state.

In an exemplary embodiment, when a ChannelClassificationRequest message for requesting channel classification information is received from the CE, the CM can generate a ChannelClassificationResponse message including channel classification information and send it to the CE in response to the ChannelClassificationRequest message, and then transition to the engaged state.

When the channel classification information of the WSO is updated (S314), the CM performs announcing channel classification information update to CE procedure to provide channel classification update information to the WSO (S315), and transitions to the engaged state. In an exemplary embodiment, the CM can generate a ChannelClassificationAnnouncement message including the updated channel classification information, send it to the CE, and then transition to the engaged state.

When the channel classification information of the CM is updated (S316), the CM performs announcing channel classification information update to CM procedure to provide the updated channel classification information to another CM (S317), and transitions to the engaged state. In an exemplary embodiment, the CM can generate a ChannelClassificationAnnouncement message including the updated channel classification information, send it to another CM, and then transition to the engaged state.

When the channel classification information of another CM is required (S318), the CM performs obtaining channel classification information by CM procedure (S319), and transitions to the engaged state. In an exemplary embodiment, the CM can generate a CMChannelClassificationRequest message, send it to another CM, receive a CMChannelClassificationResponse message from another CM in response to the CMChannelClassificationRequest message, and then transition to the engaged state. In an exemplary embodiment, the CMChannelClassificationResponse message can include the network identifier and the channel classification information of another CM. Further, when information on another CM (e.g., an SINR, a required bandwidth, a required QoS, an interface level, a fairness index, a fairness threshold, and a subscribed service) is required, the CM may request the information from another CM through an information obtaining procedure, receive a response message to the request, and then transition to the engaged state.

When a measurement result of the WSO is required (S320), the CM performs requesting measurement procedure to request measurement from the WSO (S321), and transitions to the engaged state. In an exemplary embodiment, the CM can generate a MeasurementRequest message, send it to the CE, receive a MeasurementConfirm message from the CE, and then transition to the engaged state.

It is determined whether a measurement result is received from a WSO from which one-time measurement has been requested by the CM (S322). If so, the CM performs obtaining one-time measurement procedure (S324), and transitions to the engaged state. On the other hand, when a measurement result is received from a WSO from which scheduled measurement has been requested by the CM, the CM performs obtaining scheduled measurement procedure (S323), and transitions to the engaged state.

When information from another CM is required (S325), the CM performs obtaining information from another CM procedure (S326).

It is determined whether or not the CM has subscribed to both the inter-CM coexistence discovery service and the intra-CM coexistence discovery service of the CDIS (S327). When the CM has not subscribed to both of the services, the CM performs coexistence discovery in an intra-CM domain (S328), and then performs a procedure of obtaining coexistence set information (S329). On the other hand, when the CM has subscribed to both the inter-CM and intra-CM coexistence discovery services of the CDIS, the CM can perform the procedure of obtaining coexistence set information without performing intra-CM coexistence discovery by itself.

In an exemplary embodiment, the procedure of obtaining coexistence set information can include a process in which the CM generates a CoexistenceSetInformationRequest message, sends it to the CDIS, and then receives a CoexistenceSetInformationResponse message from the CDIS. Here, the CoexistenceSetInformationRequest message can include a network identifier list of WSOs of which coexistence set information is required, and the CoexistenceSetInformationResponse message can include neighbor CM information.

It is determined whether the WSO has subscribed to an information service (S330). When the WSO has subscribed to an information service and the CM receives a coexistence report request from the CE (S331), the CM performs obtaining coexistence report procedure (S332), and transitions to the engaged state. In an exemplary embodiment, when the CE generates a CoexistenceReportRequest message and sends it to the CM, the CM can generate a CoexistenceReportResponse message and send it to the CE in response to the CoexistenceReportRequest message, and then transition to the engaged state. The CoexistenceReportResponse message can include information on coexistence set elements of the WSO (a neighbor network identifier, a neighbor network technology, and a neighbor operating channel number) and channel priority information.

When the CM receives updated registration information from the CE (S333), the CM performs WSO registration update procedure (S334), and transitions to the engaged state.

When the CM receives WSO subscription updated request from the CE (S335), the CM performs WSO subscription update procedure (S336), and transitions to the engaged state.

When it is determined that a subscription change of the WSO is required (S337), the CM performs WSO subscription change procedure (S338), and transitions to the engaged state. When a deregistration request is received from the CE (S339), the CM performs WSO registration update procedure (S340), and transitions to the engaged state.

When it is determined that a change of a subscribed discovery service type provided by the CDIS is required (S341), the CM performs a CM subscription update procedure (S342), and transitions to the engaged state.

When new subscription information is received from a new CE (S343), the CM sequentially performs the WSO subscription procedure and the WSO registration procedure (S304 and S305), and transitions to the engaged state.

When it is determined that there is no CE provided with a coexistence service from the CM (S344), the CM transitions to the active state.

Meanwhile, when it is determined in step 330 that the WSO has subscribed to a management service, the CM can select and perform one of autonomous coexistence decision making, centralized coexistence decision making, and distributed coexistence decision making.

When the CM performs autonomous coexistence decision making, the CM performs decision making independently from its neighbor CM.

When the CM performs centralized coexistence decision making, a master CM performs centralized coexistence decision making for the master CM itself and a slave CM.

When the CM performs distributed coexistence decision making, the CM performs decision making through negotiations with neighbor CMs.

When the CM performs centralized coexistence decision making (i.e., when it is determined that a master CM/a slave CM are required) (S345), the CM performs a master/slave CM selection procedure (S346). According to an exemplary embodiment, in the master/slave CM selection procedure, the CM generates a MasterCMRequest message and sends it to another CM to announce that the CM is intending to be a slave CM of another CM receiving the message, and then waits for a MasterCMResponse message from another CM.

It is determined whether or not the master/slave CM selection procedure has succeeded (S347). When the master/slave CM selection procedure has succeeded, the CM performs a master/slave CM configuring procedure (S348).

In an exemplary embodiment, the CM generates a MasterSlaveCMConfigurationRequest message, sends it to the slave CM, and transitions to the request-sent state. When a MasterSlaveCMConfigurationResponse message is received from the slave CM in response to the MasterSlaveCMConfigurationRequest message, the CM can return to the engaged state. In an exemplary embodiment, the MasterSlaveCMConfigurationRequest message can include a list of CEs managed by the master CM, and the MasterSlaveCMConfigurationResponse message can include information on each CE registered in the slave CM.

In an exemplary embodiment, it is determined whether the CM has been selected as a master CM (S349). When the CM has been selected as a master CM, the CM performs coexistence decision making for the WSO of the slave CM and registered WSOs of the CM (S351). The master CM can send a CMreconfigurationRequest message to the slave CM and transition to the request-sent state (S352). After a CMreconfigurationResponse message is received from the slave CM in response to the CMreconfigurationRequest message, the CM can return to the engaged state. Here, with regard to respective CEs registered in the CMreconfigurationResponse message, the CMreconfigurationResponse message can include at least one of a CE to be reconfigured, an operating channel list of WSOs, a transmission power limitation, a flag indicating whether or not a frequency is shared, a transmission schedule, and channel classification information.

Until coexistence decision making for the registered WSOs is completed, the CM performs a WSO reconfiguration procedure (S361 and S362), and transitions to the engaged state.

Meanwhile, when the CM has been selected as a slave CM, the CM determines whether a CM reconfiguration request is received from a master CM (S350). If so, the CM transitions to the request-received state. The slave CM having received the CM reconfiguration request generates a CMreconfigurationResponse message to respond to the master CM, and then transitions to the engaged state.

The CM performs coexistence decision making for the registered WSOs (S361), performs the WSO reconfiguration procedure (S362), and then transitions to the engaged state.

In an exemplary embodiment, the CM can generate a ReconfigurationRequest message, send it to the CE, and then transition to the engaged state when a ReconfigurationResponse message is received from the CE. In an exemplary embodiment, the ReconfigurationRequest message can include an operating channel list of the WSO, a transmission power limitation, information of whether or not a frequency is shared, a transmission schedule, and channel classification information.

Meanwhile, when the centralized coexistence decision making is not performed or the master/slave CM selection procedure has failed, that is, when neither a master CM nor a slave CM is determined, the CM decides to perform one of distributed coexistence decision making and autonomous coexistence decision making (S354 or S357).

When the CM performs distributed coexistence decision making (i.e., when a negotiation between the CMs is required), the CM performs an inter-CM negotiation procedure (S357).

The CM determines whether or not the negotiation has succeeded (S358). When the negotiation has succeeded, the CM performs coexistence decision making for the registered WSOs based on a negotiation result (S361), performs the WSO reconfiguration procedure (S362), and then transitions to the engaged state. On the other hand, when the negotiation has failed, the CM determines whether to select master/slave CMs again (S359). When it is determined not to select master/slave CMs, the CM performs autonomous coexistence decision making (S360). Then, the CM performs coexistence decision making for the registered WSOs (S361), performs the WSO reconfiguration procedure (S362), and transitions to the engaged state.

When a reconfiguration failure response is received from a registered WSO (S363), the CM performs a WSO deregistration procedure (S364), and transitions to the engaged state.

Figure 10:
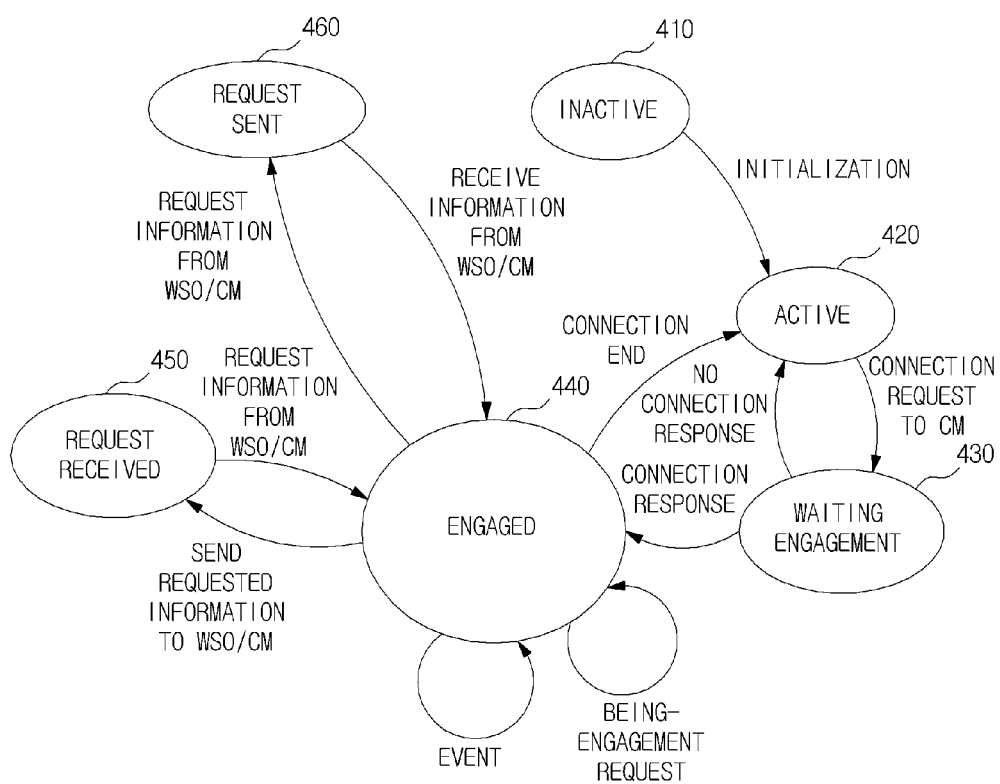
FIG. 10 shows a state machine diagram defined for operation of a coexistence enabler (CE) in a coexistence management system according to an exemplary embodiment of the present invention.

FIG. 10 shows a state machine diagram defined for operation of a CE in a coexistence management system according to an exemplary embodiment of the present invention.

As shown in the drawing, states for operation of a CE can be defined as an inactive state 410, an active state 420, a waiting engagement state 430, an engaged state 440, a request-received state 450, and a request-sent state 460. Transition conditions between the states are as follows:

- A CE transitions from the inactive state 410 to the active state 420 through an initialization process
- The CE sends a connection request to a CM in the active state 420 and then transitions to the waiting engagement state 430
- The CE returns to the active state 420 when there is no connection response from the CM within a predetermined time in the waiting engagement state 430
- The CE transitions to the engaged state 440 when there is a connection response of the CM within the predetermined time in the waiting engagement state 430
- When information is requested by a WSO/the CM in the engaged state 440, the CE transitions to the request-received state 450, sends the requested information to the WSO/the CM, and returns to the engaged state 440
- When a specific event designated in advance by the CM occurs in the engaged state 440 even if there is no request of the CM, the CE sends the corresponding event information to the CM
- When a specific event designated in advance by the CE occurs in the engaged state 440 even if no request has been made to the WSO in advance, the CE receives the corresponding event information from the WSO
- The CE requests information from the WSO/the CM in the engaged state 440 to transition to the request-sent state 460, and returns to the engaged state 440 after receiving the requested information from the WSO/the CM
- The CE maintains the engaged state 440 by periodically sending a being-engagement request to the CM in the engaged state 440
- The CE sends a disconnection request to the WSO/the CM in the engaged state 440, terminates the connection with the WSO/the CM, and transitions to the active state 420
- When a disconnection request is received from the CM in the engaged state 440, the CE terminates the connection with the CM and transitions to the active state 420

Figure 5:
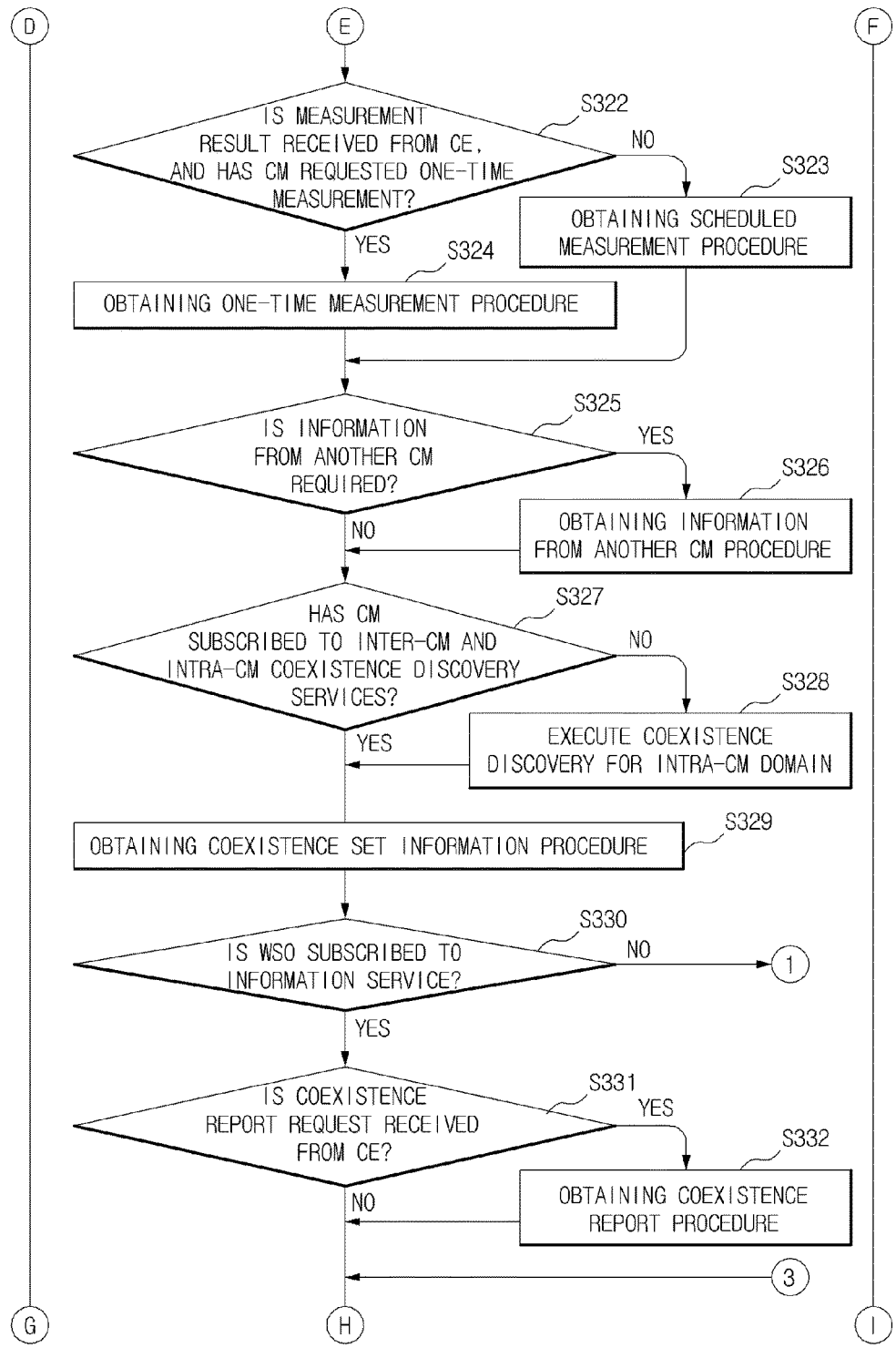
Figure 6:
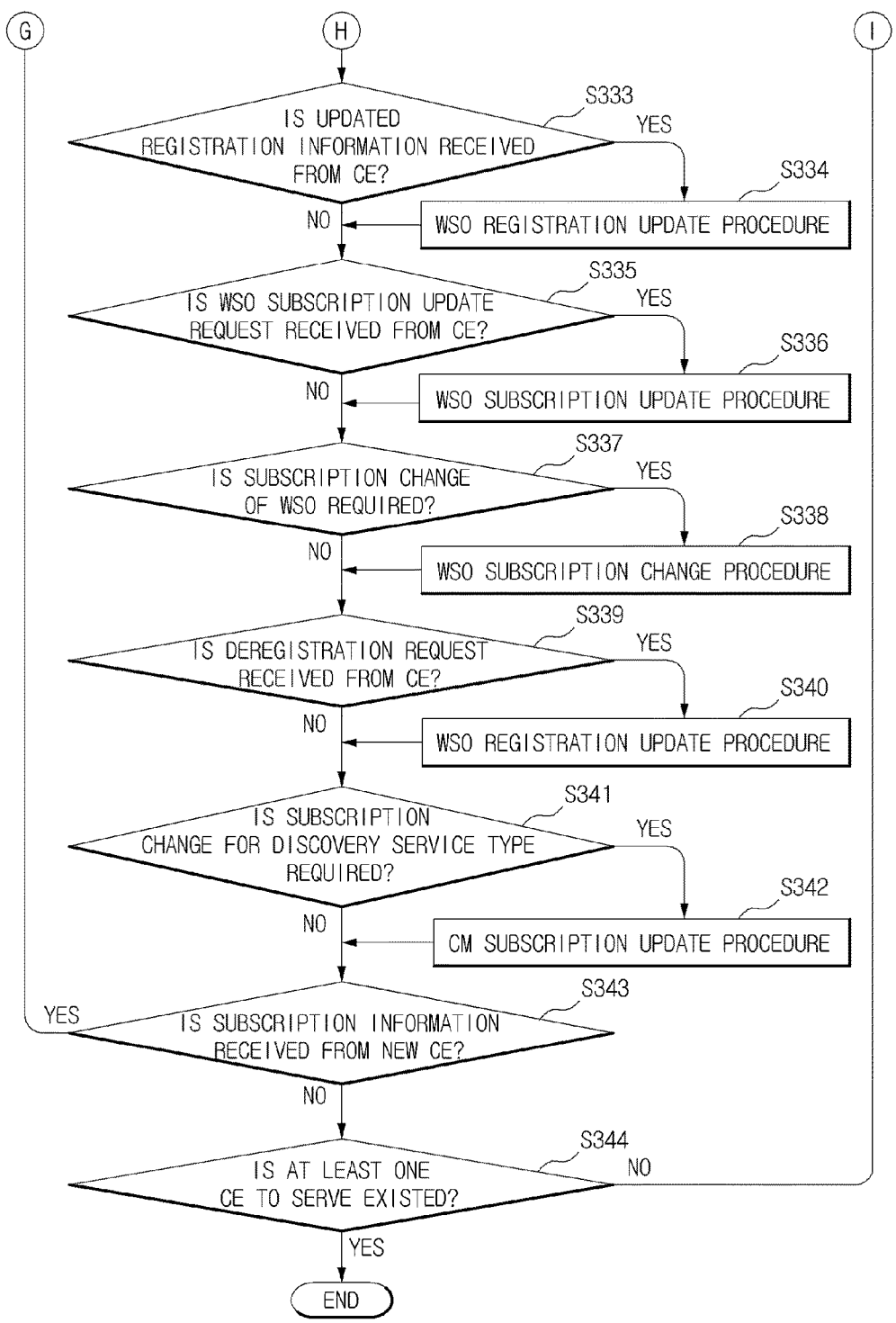
Figure 11:
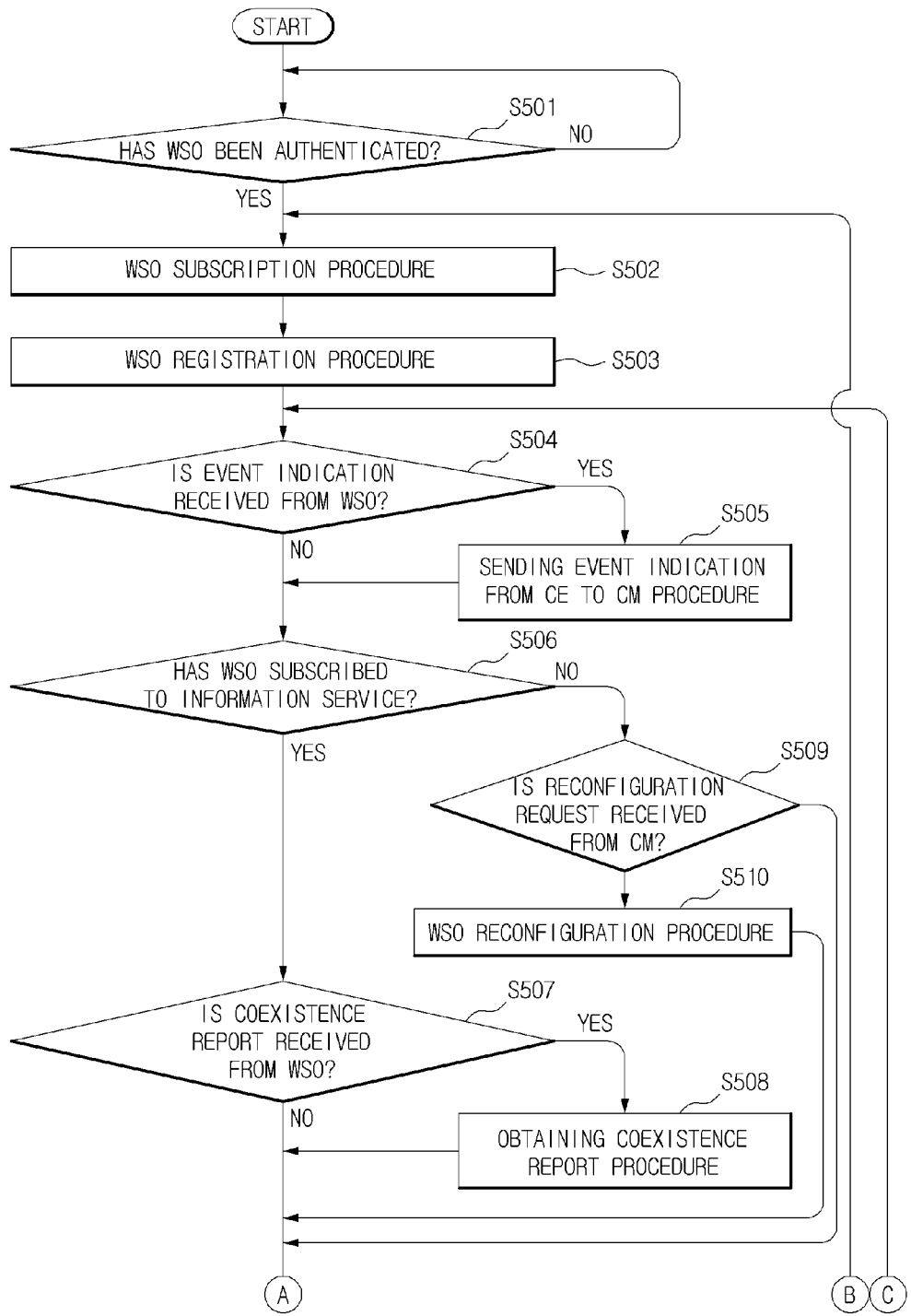
FIGS. 11 to 13 show a flowchart illustrating a CE operation in a coexistence management system according to an exemplary embodiment of the present invention.
Figure 12:
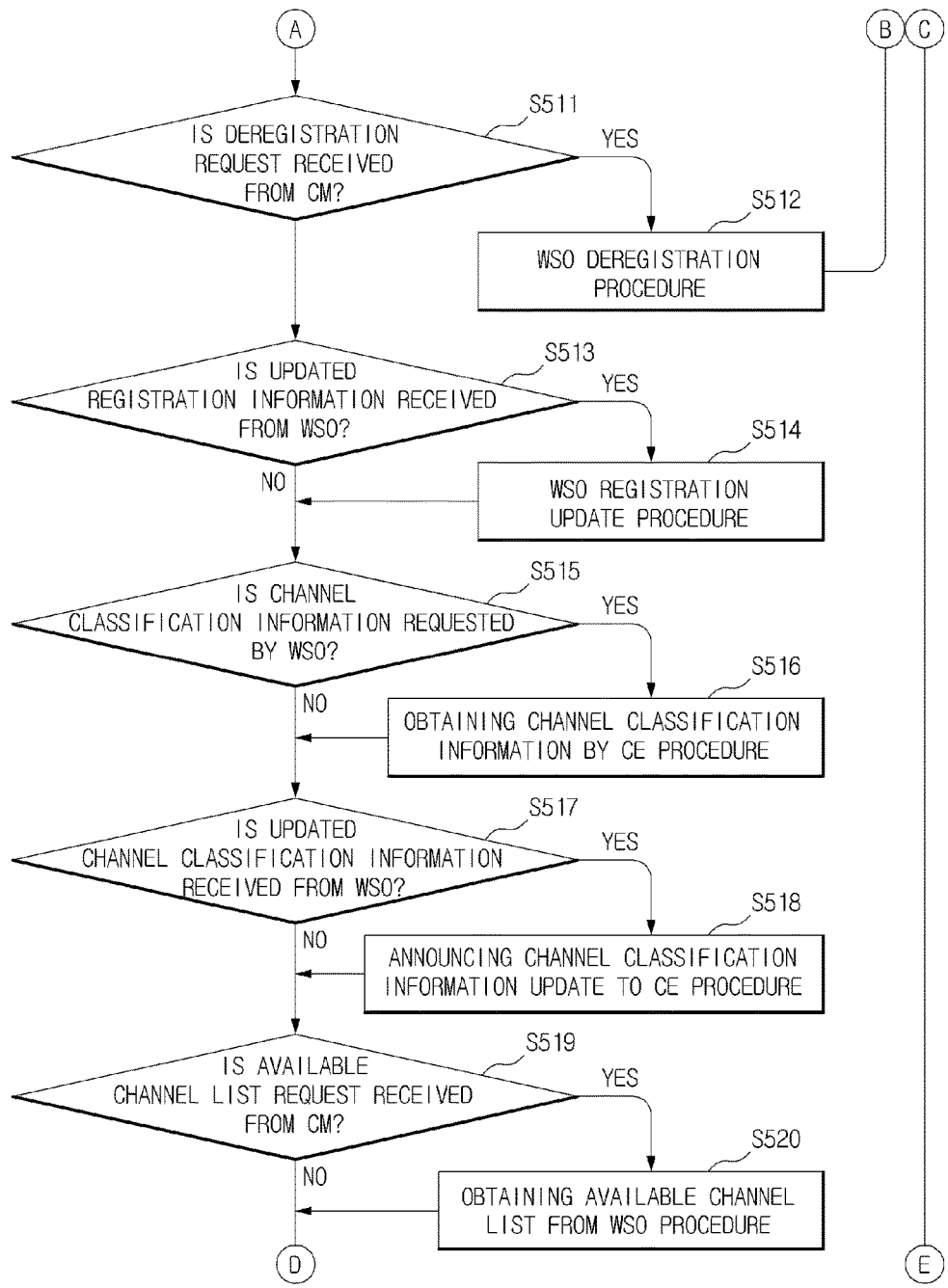
Figure 13:
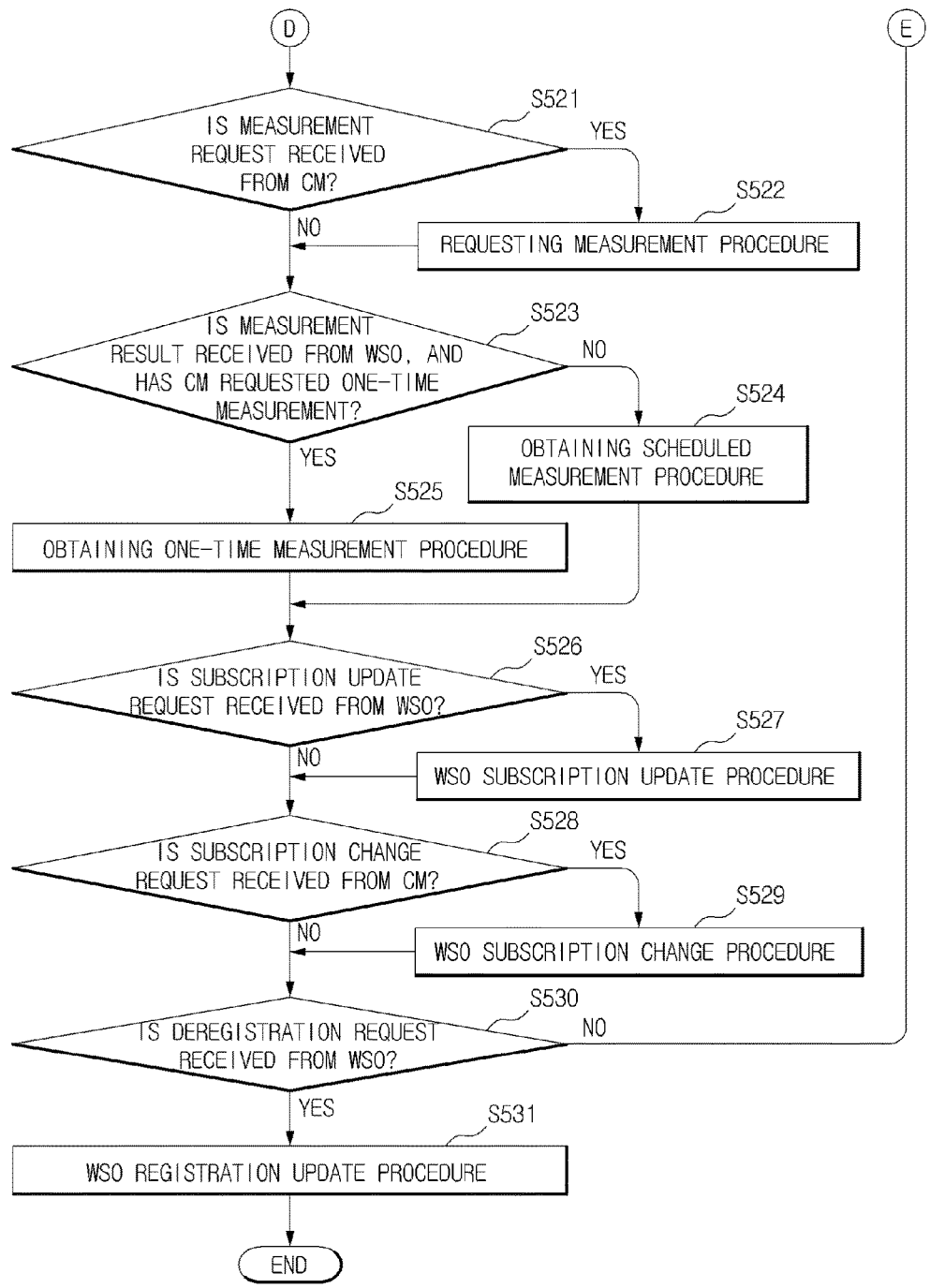

FIGS. 11 to 13 show a flowchart illustrating a CE operation in a coexistence management system according to an exemplary embodiment of the present invention. FIG. 5 sequentially shows the CE operation for convenience, but those of ordinary skill in the art would appreciate that the CE operation is not necessarily performed in the illustrated sequence.

It is determined whether WSO authentication has been successfully completed (S501). If so, a CE sequentially performs WSO subscription and registration procedures (S502 and S503), transitions to the engaged state, and checks whether an incoming message and a primitive are received from a CM and a WSO, respectively.

In an exemplary embodiment, to cause the WSO to subscribe to a coexistence service, the CE can generate a GetServiceSubscriptionRequest primitive, send it to the WSO, and then wait for a GetServiceSubscriptionResponse primitive from the WSO. After receiving a GetServiceSubscriptionResponse primitive from the WSO, the CE generates a SubscriptionRequest message, sends it to the CM, and waits for a SubscriptionResponse message from the CM.

When the CE receives an event indication from the WSO (S504), the CE performs a sending an event indication from CE to CM procedure (S505), and transitions to the engaged state.

In an exemplary embodiment, to register the WSO in the CM, the CE generates a GetRegInfoRequest primitive, sends it to the WSO, and then waits for a GetRegInfoResponse primitive from the WSO. When a GetRegInfoResponse primitive is received from the WSO, the CE generates a CERegistrationRequest message, sends it to the CM, and waits for a RegistrationResponse message from the CM. After receiving a RegistrationResponse message from the CM, the CE generates a GetRegInfoConfirm primitive and sends it to the WSO.

The CE determines which one of an information service and a management service provided by the CM the WSO has subscribed to (S506). When the WSO has subscribed to the information service, the CE determines whether a coexistence report request is received from the WSO (S507). If so, the CE performs an obtaining coexistence report procedure (S508), and transitions to the engaged state.

In an exemplary embodiment, when a CoexistenceReportRequest primitive is received from the WSO, the CE transitions to the request-received state. In response to the CoexistenceReportRequest primitive, the CE generates a CoexistenceReportRequest message and sends it to the CM. When a CoexistenceReportResponse message is received from the CM, the CE generates a CoexistenceReportResponse primitive and sends it to the WSO based on the CoexistenceReportResponse message, and transitions to the engaged state.

On the other hand, when the WSO has subscribed to the management service, the CE determines whether a reconfiguration request is received from the CM (S509). If so, the CE performs a WSO reconfiguration procedure (S510), and transitions to the engaged state.

In an exemplary embodiment, when a ReconfigurationRequest message is received from the CM, the CE transitions to the request-received state. The CE generates a PerformReconfigurationRequest primitive, sends it to the WSO, and waits for a PerformReconfigurationResponse primitive from the WSO. When a PerformReconfigurationResponse primitive is received from the WSO, the CE can generate a ReconfigurationResponse message, send it to the CM, and then transition to the engaged state.

When a deregistration request is received from the CM (S511), the CE performs a WSO deregistration procedure (S512), and searches for a new CM that will be provided with a coexistence service. After determining a new CM, the CE sequentially performs WSO subscription and registration procedures (S502 and S503), and transitions to the engaged state.

When updated registration information is received from the WSO (S513), the CE performs a WSO registration update procedure (S514), and transitions to the engaged state.

When a channel classification request is received from the other WSO (S515), the CE performs an obtaining channel classification information procedure (S516), and transitions to the engaged state.

In an exemplary embodiment, when a ChannelClassificationRequest primitive is received from the WSO, the CE generates a ChannelClassificationRequest message, sends it to the CM, and waits for a ChannelClassificationResponse message from the CM. After receiving a ChannelClassificationResponse message from the CM, the CE generates a ChannelClassificationResponse primitive and sends it to the WSO. Here, the ChannelClassificationResponse primitive can include channel classification information.

When updated channel classification information is received from the WSO (S517), the CE performs announcing channel classification information update procedure (S518), and transitions to the engaged state.

When an available channel list request is received from the CM (S519), the CE performs obtaining available channel list from WSO procedure (520), and transitions to the engaged state. In an exemplary embodiment, after receiving an available channel request message from the CM, the CE generates an AvailableChannelListRequest primitive, sends it to the WSO, and waits for an AvailableChannelListResponse primitive from the WSO. Here, the AvailableChannelListResponse primitive includes an available channel list of the WSO. When the AvailableChannelListResponse primitive is received from the WSO, the CE can generate an AvailableChannelResponse message, send it to the CM, and then transition to the engaged state.

When a measurement request is received from the CM (S521), the CE performs a requesting measurement procedure (S522), and transitions to the engaged state. The CE determines whether a measurement result is received from a WSO from which one-time measurement has been requested by the CM (S523). If so, the CE performs obtaining one-time measurement procedure (S525), and transitions to the engaged state. On the other hand, when a measurement result is received from a WSO from which scheduled measurement has been requested by the CM, the CE performs obtaining scheduled measurement procedure (S524), and transitions to the engaged state.

When a subscription update request is received from the WSO (S526), the CE performs a WSO subscription update procedure (S527), and transitions to the engaged state.

When a subscription change request is received from the CM (S528), the CE performs a WSO subscription change procedure (S529), and transitions to the engaged state.

When a deregistration request is received from the WSO (S530), the CE performs a WSO registration update procedure (S531), and transitions to the active state.

Figure 14:
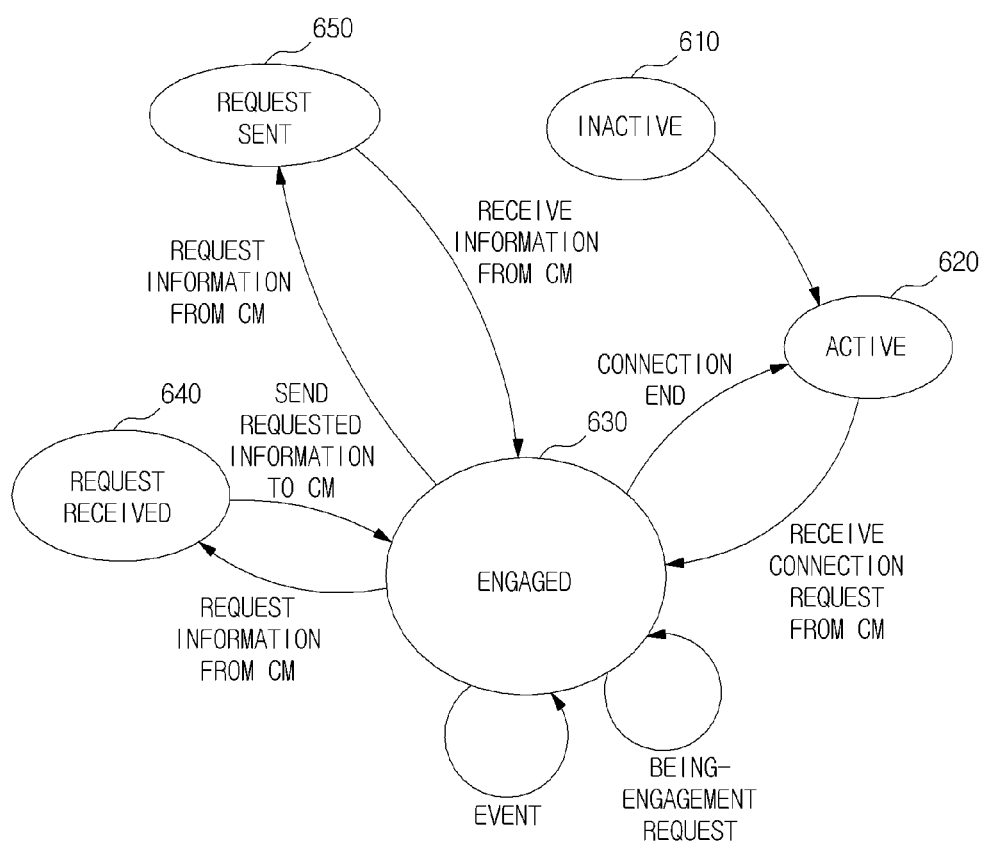
FIG. 14 shows a state machine diagram defined for operation of a coexistence discovery and information server (CDIS) in a coexistence management system according to an exemplary embodiment of the present invention.

FIG. 14 shows is a state machine diagram defined for operation of a CDIS in a coexistence management system according to an exemplary embodiment of the present invention.

As shown in the drawing, states for operation of a CDIS can be defined as an inactive state 610, an active state 620, an engaged state 630, a request-received state 640, and a request-sent state 650. Transition conditions between the states are as follows:

The inactive state 610 transitions to the active state 620 through an initialization process When a connection request is received from a CM in the active state 420, a CDIS sends a connection response to the CM and transitions to the engaged state 630

When the CM requests information from the CDIS in the engaged state 630, the CDIS transitions to the request-received state 640, sends the information requested by the CM, and returns to the engaged state 630

When a specific event designated in advance by the CM occurs in the engaged state 630 even if there is no request of the CM, the CDIS sends the corresponding event information to the CM When a specific event designated in advance by the CDIS occurs in the engaged state 630 even if no request has been made to the CM in advance, the CDIS receives the corresponding event information from the CM The CDIS requests information from the CM in the engaged state 630 to transition to the request-sent state 650, and returns to the engaged state 630 upon receiving the requested information from the CM When a being-engagement request is periodically received from the CM in the engaged state 630, the CDIS maintains the engaged state 630

When, in the engaged state 630, a disconnection request is received from the CM or the being-engagement request is not periodically received from the CM, the CDIS terminates the connection with the CM and transitions to the active state 620

After sending a disconnection request to the CM in the engaged state 630, the CDIS terminates the connection with the CM and transitions to the active state 620

Figure 7:
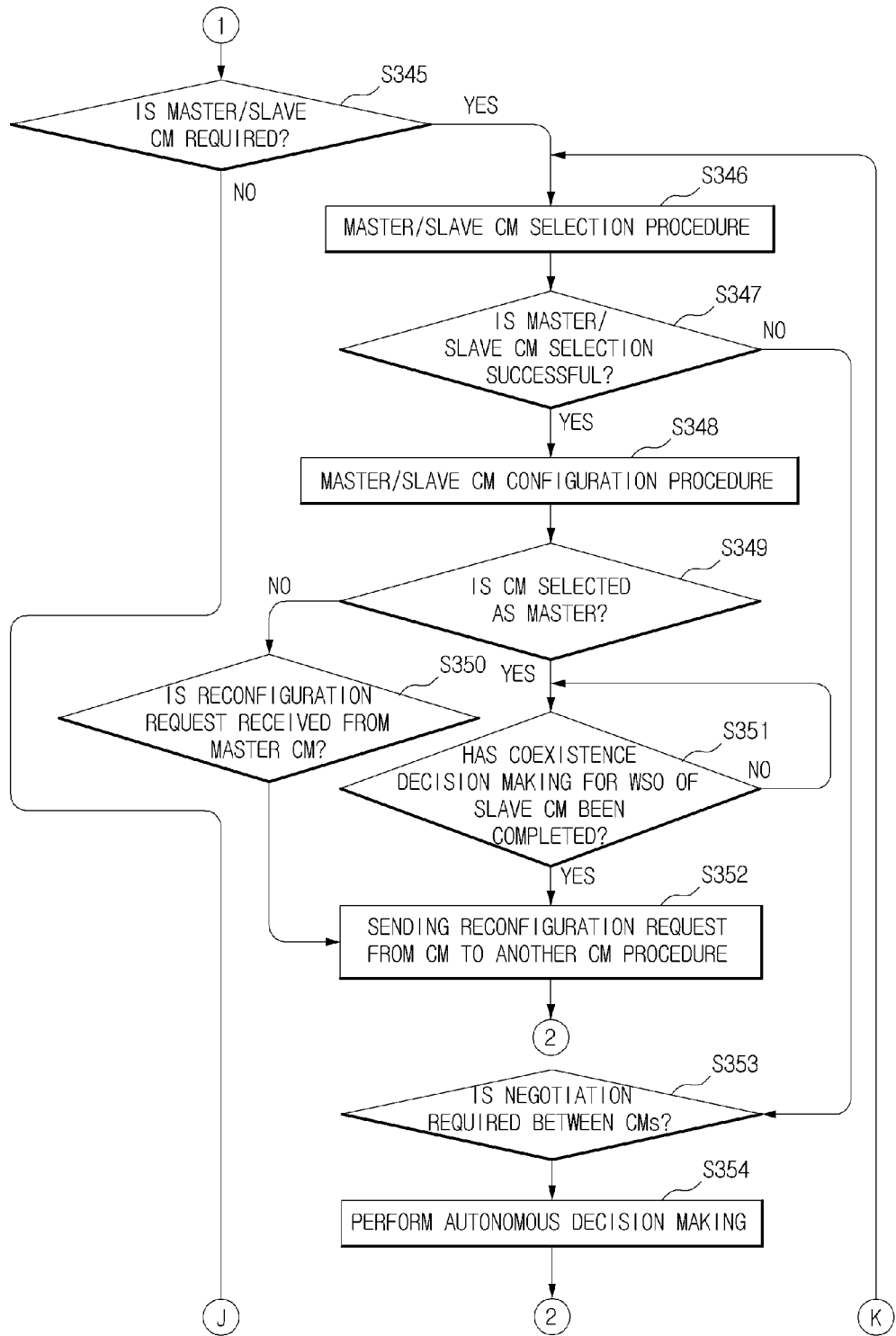
Figure 8:
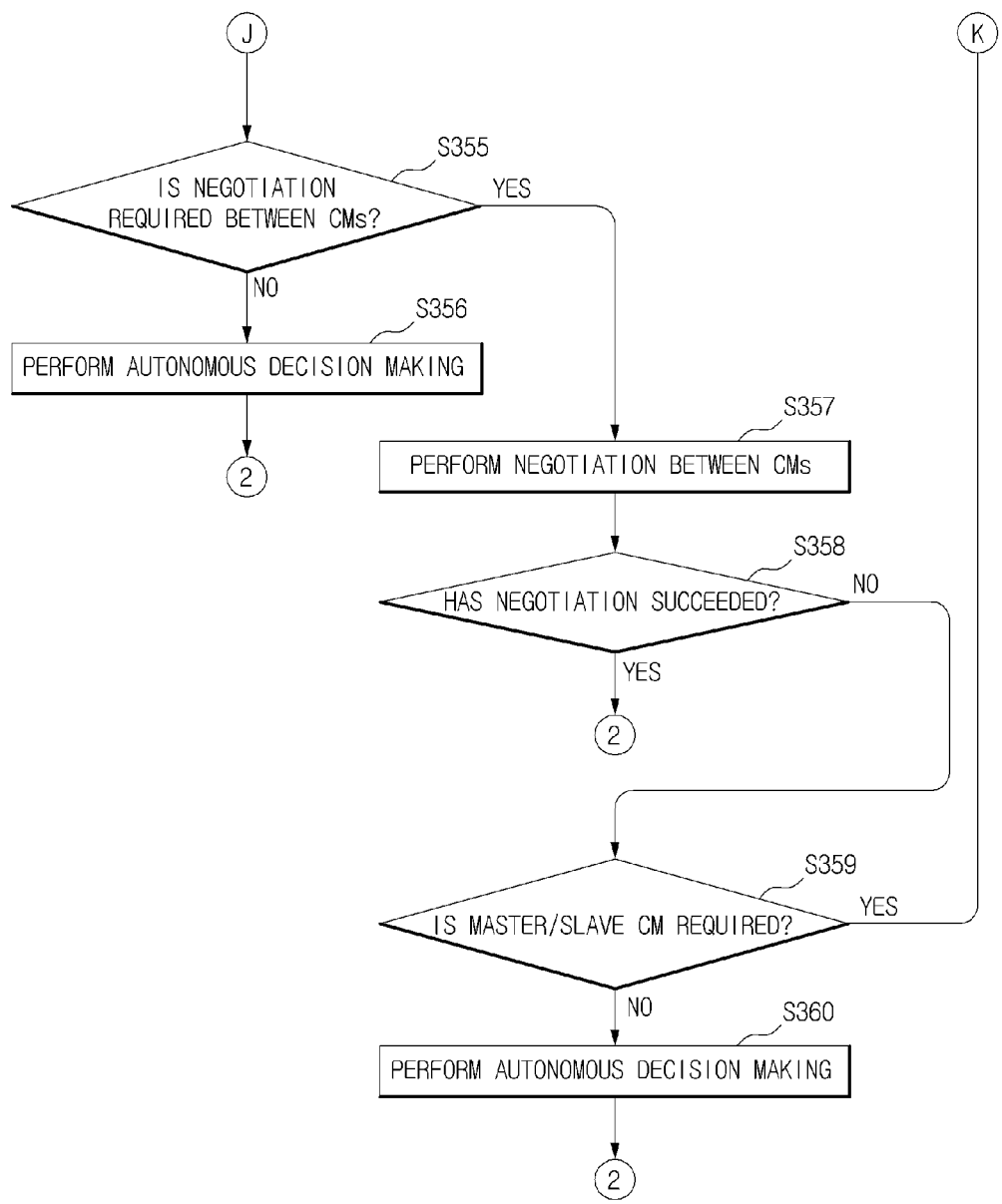
Figure 9:
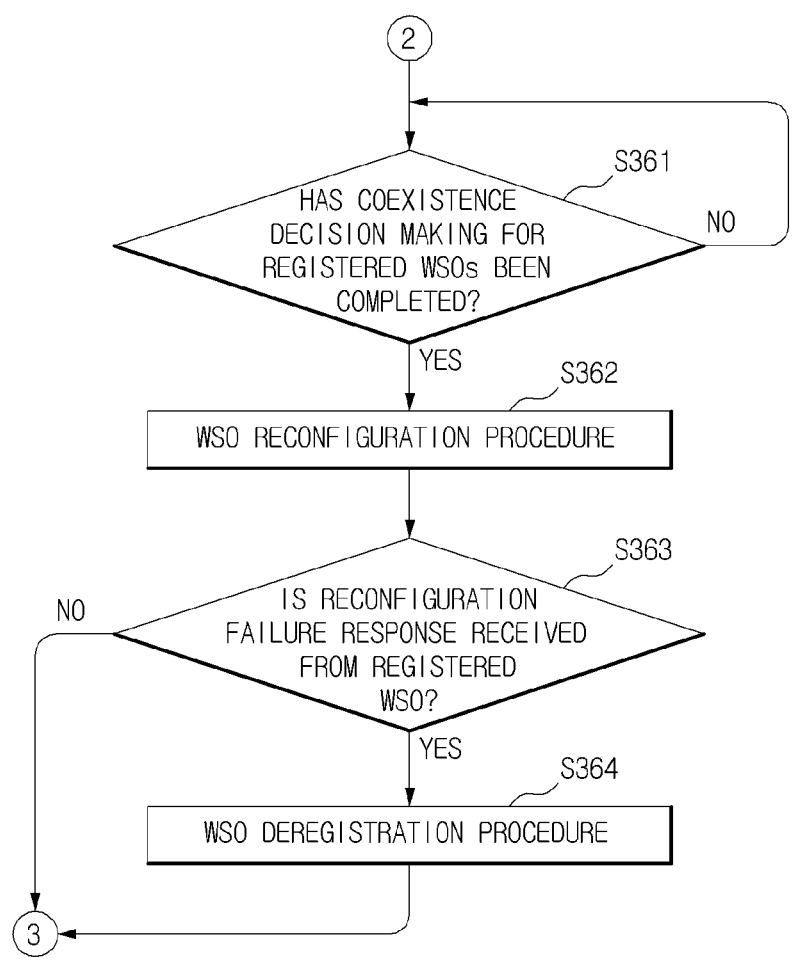
Figure 15:
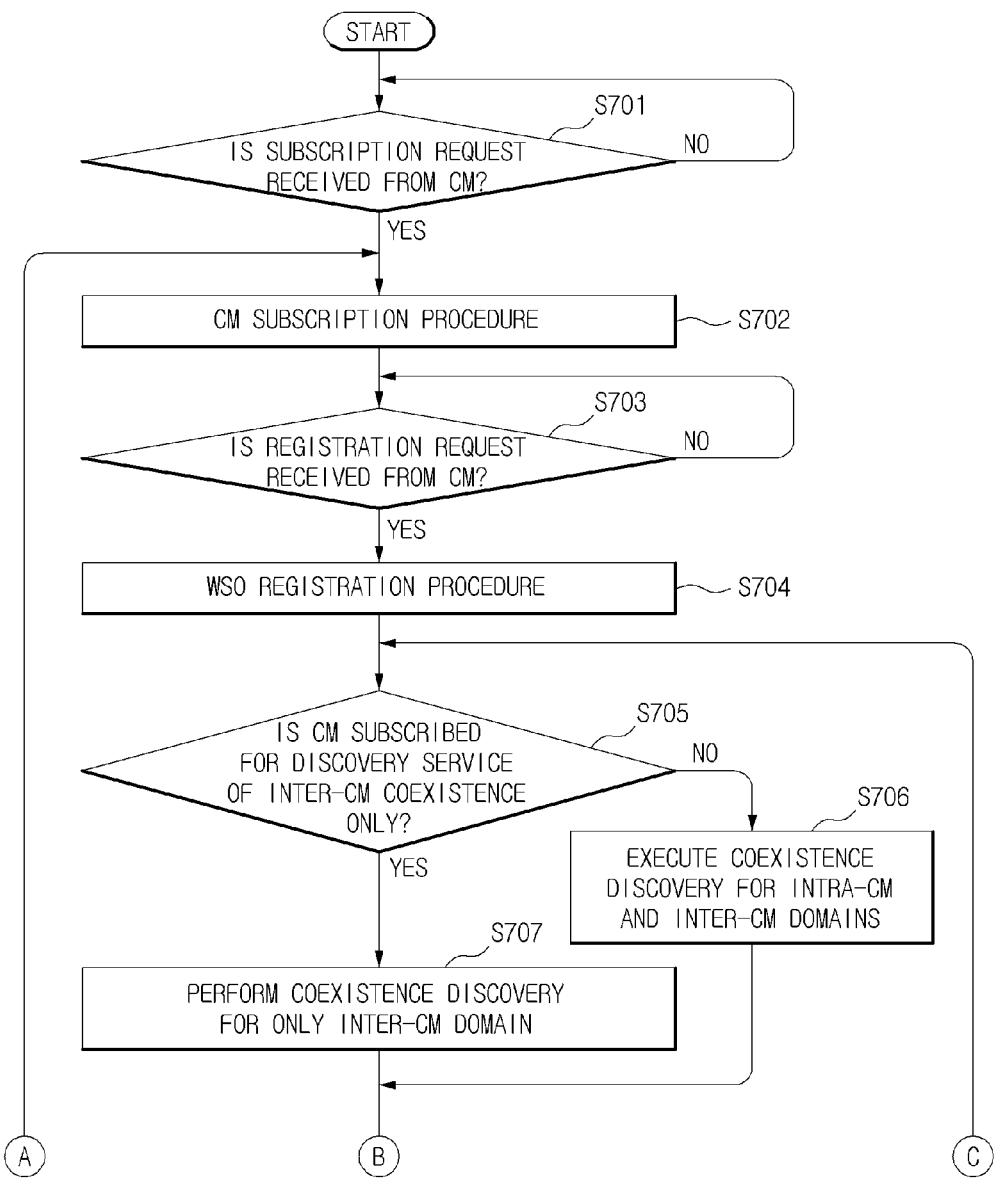
FIGS. 15 and 16 show a flowchart illustrating a CDIS operation in a coexistence management system according to an exemplary embodiment of the present invention.
Figure 16:
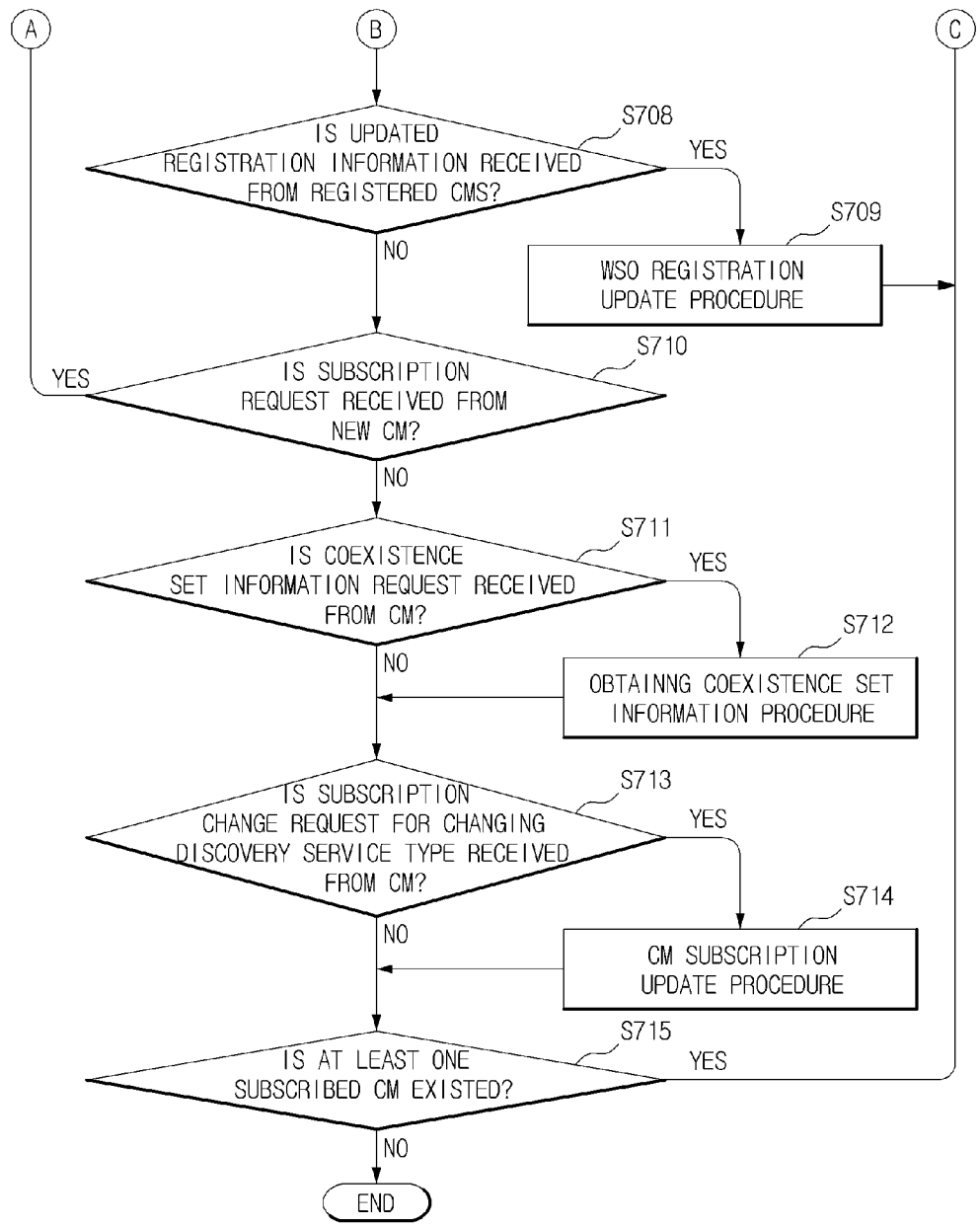

FIGS. 15 and 16 show a flowchart illustrating a CDIS operation in a coexistence management system according to an exemplary embodiment of the present invention. FIG. 7 sequentially shows the CDIS operation for convenience, but those of ordinary skill in the art would appreciate that the CDIS operation is not necessarily performed in the illustrated sequence.

After CM authentication is successfully completed, a CDIS transitions to the engaged state, and checks an incoming message from a CM.

When a subscription request is received from the CM (S701), the CDIS performs a CM subscription procedure (S702), and transitions to the engaged state.

When a registration request is received from the CM (S703), the CDIS performs a WSO registration procedure (S704), and transitions to the engaged state.

After WSO registration, it is determined whether the CM has subscribed to only the inter-CM coexistence discovery service of the CDIS (S705). If so, the CDIS performs coexistence discovery in an inter-CM domain (S707). On the other hand, when the CM has subscribed to the inter-CM and intra-CM coexistence discovery services of the CDIS, the CDIS performs coexistence discovery in both of the inter-CM and intra-CM domains (S706).

When updated registration information is received from the CM (S708), the CDIS performs a WSO registration update procedure (S709), and transitions to the engaged state. After WSO registration updating, the CDIS performs coexistence discovery according to the type of a discovery service of the CDIS to which the CM has subscribed.

When a subscription request is received from a new CM (S710), the CDIS performs a CM subscription procedure (S702), and transitions to the engaged state.

When a coexistence set information request is received from the CM (S711), the CDIS performs an obtaining coexistence set information procedure for providing appropriate information for the type of the discovery service of the CDIS to which the CM has subscribed (S712), and transitions to the engaged state.

In an exemplary embodiment, when a CoexistenceSetInformationRequest message is received from the CM, the CDIS transitions to the request-received state. The CDIS can generate a CoexistenceSetInformationResponse message, send it to the CM, and then transition to the engaged state. Here, the CoexistenceSetInformationResponse message can include a neighbor CM list.

When a subscription change request for changing the type of an existing discovery service is received from the CM (S713), the CDIS performs a CM subscription update procedure (S714), and transitions to the engaged state.

When there is no CM provided with a discovery service by the CDIS (S715), the CDIS transitions to the active state.

Figure 17:
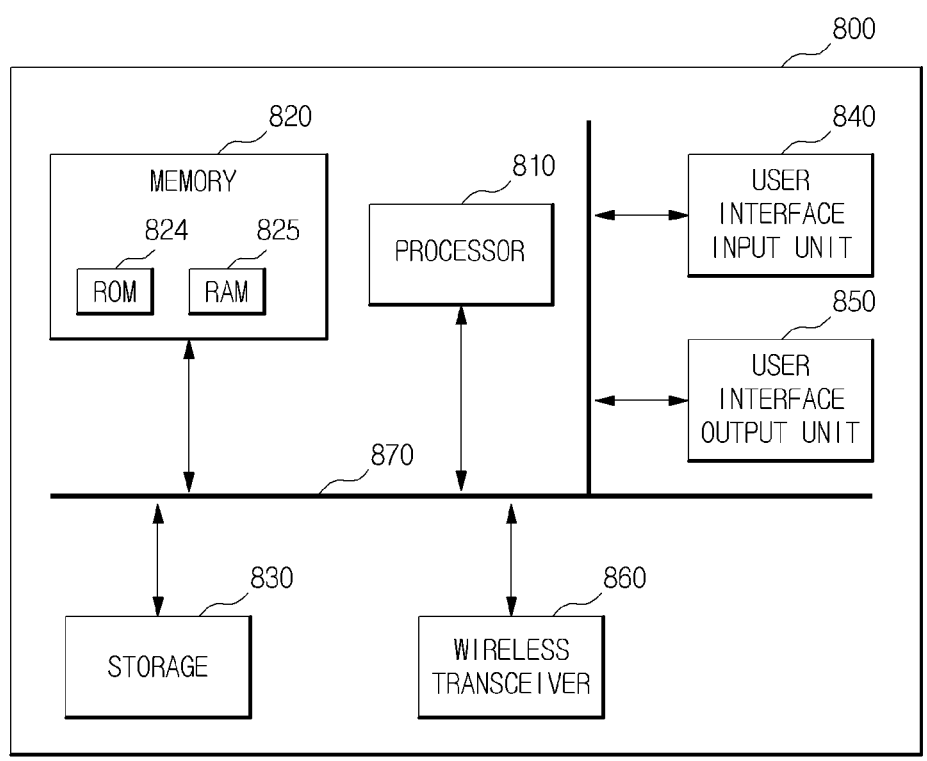
FIG. 17 shows a block diagram showing a structure of a coexistence management system entity according to an exemplary embodiment of the present invention.

FIG. 17 shows a block diagram showing a structure of a coexistence management system entity according to an exemplary embodiment of the present invention. As shown in FIG. 17, like a general-purpose computer system, each entity of the coexistence management system, that is, a CE, a CM, and a CDIS, can include at least one element among at least one processor 810, a memory 820, a storage 830, a user interface input unit 840, a user interface output unit 850, and a wireless transceiver 860, and these can communicate with each other via a bus 870.

The processor 810 can be a central processing unit (CPU) or a semiconductor device that executes instructions stored in the memory 820 and/or the storage 830. The memory 820 and/or the storage 830 can include various types of volatile/non-volatile storage media. For example, the memory 820 can include a read only memory (ROM) 824 and a random access memory (RAM) 825.

The entity operating methods according to the above-described exemplary embodiments of the present invention can be implemented in the form of computer-executable instructions and recorded in the memory 820 and/or the storage 830. When the instructions are executed by the processor 810, an entity operating method according to at least one exemplary embodiment of the present invention can be performed.

In addition, an apparatus and method according to exemplary embodiments of the present invention may be implemented in the form of program instructions that can be executed by various computer means and may be recorded in a computer-readable medium. The computer-readable medium can include a program instruction, a data file, a data structure, etc., solely or in a combined manner The program instruction recorded in the computer-readable medium may be specially designed and configured for the present invention, or known and available to those of ordinary skill in the field of computer software. Examples of the computer-readable medium include magnetic media, such as a hard disk, a floppy disk, and a magnetic tape, optical media, such as a CD-ROM and a DVD, magneto-optical media, such as a floptical disk, and hardware devices, such as a ROM, a RAM, and a flash memory, specially configured to store and perform program instructions. The above-described medium may also be a transmission medium, such as light, a metal wire, or a waveguide including carrier waves that send signals for designating program instructions, data structures, and so on. Examples of the program instructions may include high-level language codes executable by a computer using an interpreter, etc. as well as machine language codes made by compilers.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An operating method of a coexistence manager (CM) in a coexistence management system including a coexistence enabler (CE), the CM, and a coexistence discovery and information server (CDIS), the operating method performed by the CM and comprising:
  sending a connection request to the CDIS or another CM in an active state, and then transitioning to a waiting engagement state;
  when a connection response is received in the waiting engagement state within a predetermined time, transitioning to an engaged state;
  when an information request is received from one of the CE, the CDIS, and another CM, transitioning to a request-received state;
  sending requested information to the one of the CE, the CDIS, and another CM in the request-received state in response to the request, and returning to the engaged state;
  requesting information from one of the CE, the CDIS, and another CM in the engaged state, and transitioning to a request-sent state; and
  when the requested information is received from the one of the CE, the CDIS, and another CM in the request-sent state, returning to the engaged state,
  when an event indication is received from the CE or another CM occurs in the engaged state, performing sending information on the event indication to the CE or another CM and transitioning to the engaged state.

2. The operating method of claim 1, further comprising returning to the active state when no connection response is received from the CDIS or another CM, to which the connection request is sent, in the waiting engagement state.

3. The operating method of claim 1, further comprising:
terminating a connection with the CDIS or another CM when, in the engaged state, the CM transmits a disconnection request to the CDIS or another CM, receives a disconnection request from the CDIS or another CM, or does not periodically receive a being-engagement request from the CE or another CM; and
transitioning to the active state when there is no CE provided with a coexistence service by the CM.

4. The operating method of claim 1, further comprising, when an event previously requested by the CM occurs in the engaged state in the CE or another CM, receiving information on the event from the CE or another CM.

5. The operating method of claim 1, wherein the information requested by the one of the CE, the CDIS, and another CM in the engaged state is channel classification information or a coexistence report.

6. The operating method of claim 1, wherein the information requested from the one of the CE, the CDIS, and another CM in the engaged state is an available channel list, channel classification information, a measurement result, or coexistence set information.

7. The operating method of claim 1, wherein the requesting of the information from the one of the CE, the CDIS, and another CM in the engaged state and the transitioning to the request-sent state include, when the CM is selected as a master CM, sending a CM reconfiguration request message to a slave CM and transitioning to the request-sent state, and
the receiving of the requested information from the one of the CE, the CDIS, and another CM in the request-sent state in response to the request and the returning to the engaged state include returning to the engaged state when a CM reconfiguration response message is received from the slave CM.

8. The operating method of claim 1, wherein the transitioning to the request-received state when the information request is received from the one of the CE, the CDIS, and another CM includes, when the CM is selected as a slave CM, receiving a CM reconfiguration request message from a master CM and transitioning to the request-received state, and
the sending of the requested information to the one of the CE, the CDIS, and another CM in the request-received state in response to the request and the returning to the engaged state include generating, by the slave CM, a CM reconfiguration response message, sending CM reconfiguration response message to the master CM, and then returning to the engaged state.

9. An operating method of a coexistence enabler (CE) in a coexistence management system including the CE, a coexistence manager (CM), and a coexistence discovery and information server (CDIS), the operating method performed by the CE and comprising:
sending a connection request to the CM in an active state, and then transitioning to a waiting engagement state;
when a connection response is received from the CM in the waiting engagement state within a predetermined time, transitioning to an engaged state;
when an information request is received from a white space object (WSO) or the CM associated with the CE, transitioning to a request-received state;
sending requested information to the WSO or the CM in the request-received state in response to the request, and returning to the engaged state;
requesting information from the WSO or the CM associated with the CE in the engaged state, and transitioning to a request-sent state; and
when the requested information is received from the WSO or the CM in the request-sent state, returning to the engaged state.

10. The operating method of claim 9, further comprising returning to the active state when no connection response is received from the CM in the waiting engagement state within the predetermined time.

11. The operating method of claim 9, further comprising:
terminating a connection with the CM or the WSO when, in the engaged state, the CE transmits a disconnection request to the WSO or the CM, or receives a disconnection request from the CM; and
transitioning to the active state.

12. The operating method of claim 9, further comprising:
maintaining the engaged state by periodically sending a being-engagement request to the CM.

13. The operating method of claim 9, wherein the transitioning to the request-received state when the information request is received from the WSO or the CM associated with the CE includes receiving a CoexistenceReportRequest primitive from the WSO and transitioning to the request-received state, and
the sending of the requested information to the WSO or the CM in the request-received state in response to the request and the returning to the engaged state include generating a CoexistenceReportRequest message and sending the CoexistenceReportRequest message to the CM, and when a CoexistenceReportResponse message is received from the CM in response to the CoexistenceReportRequest message, generating a CoexistenceReportResponse primitive and sending the CoexistenceReportResponse primitive to the WSO based on the CoexistenceReportResponse message and then returning to the engaged state.

14. The operating method of claim 9, wherein the transitioning to the request-received state when the information request is received from the WSO or the CM associated with the CE includes receiving a reconfiguration request from the CM and transitioning to the request-received state, and
the sending of the requested information to the WSO or the CM in the request-received state in response to the request and the returning to the engaged state include generating a Perform ReconfigurationRequest primitive and sending the PerformReconfigurationRequest primitive to the WSO associated with the CE, and when a PerformReconfigurationResponse primitive is received from the WSO, generating a ReconfigurationResponse message and sending the ReconfigurationResponse message to the CM based on the PerformReconfigurationResponse primitive, and then returning to the engaged state.

15. An operating method of a coexistence discovery and information server (CDIS) in a coexistence management system including a coexistence enabler (CE), a coexistence manager (CM), and the CDIS, the operating method performed by the CDIS and comprising:
when a connection request is received from the CM in an active state, sending a connection response to the CM and transitioning to an engaged state;
when a request for information is received from the CM in the engaged state, transitioning to a request-received state;

sending the requested information to the CM in the request-received state, and returning to the engaged state;

requesting information from the CM in the engaged state, and transitioning to a request-sent state;

when the information requested by the CDIS is received from the CM in the request-sent state, returning to the engaged state, determining whether the CM has subscribed to only the inter-CM coexistence discovery service of the CDIS;

when the CM has subscribed to the inter-CM and intra-CM coexistence discovery services of the CDIS, performing coexistence discovery in an inter-CM domain; and when the CM has not subscribed to the inter-CM and intra-CM coexistence discovery services of the CDIS, performing coexistence discovery in both of the inter-CM and intra-CM domains.

16. The operating method of claim 15, further comprising maintaining the engaged state when a being-engagement request is periodically received from the CM in the engaged state.

17. The operating method of claim 15, further comprising:
terminating a connection with the CM when, in the engaged state, the CDIS receives a disconnection request from the CM, does not periodically receive a being-engagement request from the CM, or transmits a disconnection request to the CM; and
transitioning to the active state.

18. The operating method of claim 15, wherein the transitioning to the request-received state when the request for the information is received from the CM in the engaged state includes receiving a CoexistenceSetInformation Request message from the CM and transitioning to the request-received state, and
the sending of the requested information to the CM in the request-received state and the returning to the engaged state include generating a CoexistenceSetInformation Response message, sending the CoexistenceSetInformation Response message to the CM, and then returning to the engaged state.

19. The operating method of claim 15, further comprising transitioning to the active state when there is no CM provided with a discovery service by the CDIS.

20. The operating method of claim 1, further comprises, when an available channel list from the WSO is required, performing obtaining available channel list from the WSO procedure and transitioning to the engaged state.

21. The operating method of claim 1, further comprises, when the CM is received channel classification request from CE, performing obtaining channel classification information by the CE procedure and transitioning to the engaged state.

22. The operating method of claim 1, further comprises, when channel classification information of the WSO is updated, performing announcing channel classification information update to the CE procedure and transitioning to the engaged state.

23. The operating method of claim 1, further comprises, when channel classification information of the CM is updated, performing announcing channel classification information update to the CM procedure and transitioning to the engaged state.

24. The operating method of claim 1, further comprises, when channel classification information of another CM is required, performing obtaining channel classification information by the CM procedure and transitioning to the engaged state.

25. The operating method of claim 1, further comprises, when a measurement result of the WSO is required, performing requesting measurement procedure and transitioning to the engaged state.

26. The operating method of claim 9, further comprises, when updated registration information is received from the WSO, performing WSO registration update procedure and transitioning to the engaged state.

27. The operating method of claim 9, further comprises, when a channel classification request is received from the other WSO, performing obtaining channel classification information by CE procedure and transitioning to the engaged state.

28. The operating method of claim 9, further comprises, when updated channel classification information is received from the WSO, performing announcing channel classification information update to CE procedure and transitioning to the engaged state.

29. The operating method of claim 9, further comprises, when an available channel list request is received from the CM, performing obtaining available channel list from WSO procedure and transitioning to the engaged state.

30. The operating method of claim 9, further comprises, when a measurement request is received from the CM, performing requesting measurement procedure and transitioning to the engaged state.

31. The operating method of claim 9, further comprises, when the CE receives measurement result from WSO and the CM requested one-time measurement, performing obtaining one-time measurement procedure and transitioning to the engaged state.

32. The operating method of claim 9, further comprises, when the CE receives measurement result from WSO and the CM requested scheduled measurement, performing obtaining updated registration information from WSO procedure and transitioning to the engaged state.

33. The operating method of claim 9, further comprises, when a subscription update request is received from the WSO, performing WSO subscription update procedure and transitioning to the engaged state.

34. The operating method of claim 9, further comprises, when a subscription change request is received from the CM, performing WSO subscription change procedure and transitioning to the engaged state.

35. The operating method of claim 15, further comprises, when updated registration information is received from the CM, performing WSO registration update procedure, and transitioning to the engaged state.

36. The operating method of claim 15, further comprises, when a subscription request is received from a new CM, performing CM subscription procedure and transitioning to the engaged state.

37. The operating method of claim 15, further comprises, when a coexistence set information request is received from the CM, performing obtaining coexistence set information procedure providing coexistence set information based on the type of discovery service the CM subscribed and transitioning to the engaged state.

38. The operating method of claim 15, further comprises, subscription change request for changing the type of an existing discovery service is received from the CM, performing CM subscription update procedure and transitioning to the engaged state.

* * * * *